(12) United States Patent
Sagong et al.

(10) Patent No.: US 10,452,232 B2
(45) Date of Patent: Oct. 22, 2019

(54) METHOD AND AN ELECTRONIC DEVICE FOR ONE-HAND USER INTERFACE

(71) Applicant: Samsung Electronics Co., Ltd, Gyeonggi-do (KR)

(72) Inventors: Jin Sagong, Gyeonggi-do (KR); Chul Kwi Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 475 days.

(21) Appl. No.: 15/197,602

(22) Filed: Jun. 29, 2016

(65) Prior Publication Data

US 2016/0378282 A1 Dec. 29, 2016

(30) Foreign Application Priority Data

Jun. 29, 2015 (KR) .................. 10-2015-0091938

(51) Int. Cl.
G06F 3/048 (2013.01)
G06F 3/0482 (2013.01)
G06F 3/0488 (2013.01)
G06F 3/0481 (2013.01)

(52) U.S. Cl.
CPC ........ *G06F 3/0482* (2013.01); *G06F 3/04817* (2013.01); *G06F 3/04883* (2013.01); *G06F 3/04886* (2013.01); *G06F 2203/04803* (2013.01)

(58) Field of Classification Search
CPC ... G06F 3/0416; G06F 17/3002; G06F 3/0482
See application file for complete search history.

(56) References Cited

U.S. PATENT DOCUMENTS

| | | | |
|---|---|---|---|
| 2010/0085317 A1* | 4/2010 | Park | G06F 1/1626 345/173 |
| 2010/0289754 A1* | 11/2010 | Sleeman | G06F 3/0416 345/173 |
| 2012/0074227 A1 | 3/2012 | Ferren et al. | |
| 2012/0075194 A1 | 3/2012 | Ferren | |
| 2012/0075452 A1 | 3/2012 | Ferren | |
| 2012/0079265 A1 | 3/2012 | Ferren | |
| 2012/0118971 A1 | 5/2012 | Ferren et al. | |
| 2012/0118972 A1 | 5/2012 | Ferren et al. | |
| 2012/0118973 A1 | 5/2012 | Ferren et al. | |

(Continued)

FOREIGN PATENT DOCUMENTS

| | | |
|---|---|---|
| EP | 2790096 A2 | 10/2014 |
| WO | 2010147611 A1 | 12/2010 |

(Continued)

OTHER PUBLICATIONS

Communication pursuant to Article 94(3) EPC dated Sep. 20, 2017 in connection with European Patent Application No. 16 176 075.6.

(Continued)

*Primary Examiner* — Linh K Pham

(57) ABSTRACT

An electronic device includes a touch panel configured to receive a user input at a location and a display configured to output at least one object on at least one of a plurality of grid areas. The plurality of grid areas is arranged in a plurality of rows and a plurality of columns. A processor is configured to rearrange an output location of the at least one object outputted on the at least one grid area in response to receiving the user input.

13 Claims, 16 Drawing Sheets

(56) References Cited

U.S. PATENT DOCUMENTS

| | | |
|---|---|---|
| 2012/0120301 A1 | 5/2012 | Ferren et al. |
| 2012/0157127 A1 | 6/2012 | Ferren et al. |
| 2012/0190408 A1 | 7/2012 | Ferren et al. |
| 2012/0268405 A1 | 10/2012 | Ferren et al. |
| 2012/0268581 A1 | 10/2012 | Ferren |
| 2012/0270575 A1 | 10/2012 | Ferren et al. |
| 2012/0270601 A1 | 10/2012 | Ferren et al. |
| 2012/0272313 A1 | 10/2012 | Ferren |
| 2012/0276932 A1 | 11/2012 | Ferren et al. |
| 2013/0019321 A1 | 1/2013 | Ferren |
| 2013/0212535 A1* | 8/2013 | Kim .................. G06F 3/0482 715/841 |
| 2013/0307783 A1* | 11/2013 | Park ................ G06F 3/04886 345/169 |
| 2013/0307801 A1* | 11/2013 | Nam .................... G06F 3/041 345/173 |
| 2014/0068492 A1 | 3/2014 | Yu et al. |
| 2014/0111451 A1* | 4/2014 | Park ................ G06F 3/04883 345/173 |
| 2014/0247221 A1 | 9/2014 | Ferren |
| 2014/0247222 A1 | 9/2014 | Ferren |
| 2014/0300560 A1* | 10/2014 | An .................... G06F 3/0488 345/173 |
| 2015/0084885 A1 | 3/2015 | Kawamoto |
| 2015/0121229 A1* | 4/2015 | Wang .................. G06F 3/0484 715/728 |
| 2015/0150121 A1 | 5/2015 | Ferren |
| 2015/0220218 A1* | 8/2015 | Jeon ................ G06F 3/04886 715/825 |
| 2016/0026884 A1 | 1/2016 | Ferren |
| 2016/0034901 A1 | 2/2016 | Ferren |
| 2016/0070371 A1* | 3/2016 | Oonishi .................. G06F 3/044 345/174 |
| 2016/0291731 A1* | 10/2016 | Liu ........................ G06F 1/1656 |

FOREIGN PATENT DOCUMENTS

| | | |
|---|---|---|
| WO | 2013176472 A1 | 11/2013 |
| WO | 2014036383 A2 | 3/2014 |

OTHER PUBLICATIONS

European Patent Office, "European Search Report," Application No. 16176075.6-1507, dated Nov. 23, 2016, 10 pages, publisher EPO, Munich, Germany, place of search Berlin.

* cited by examiner

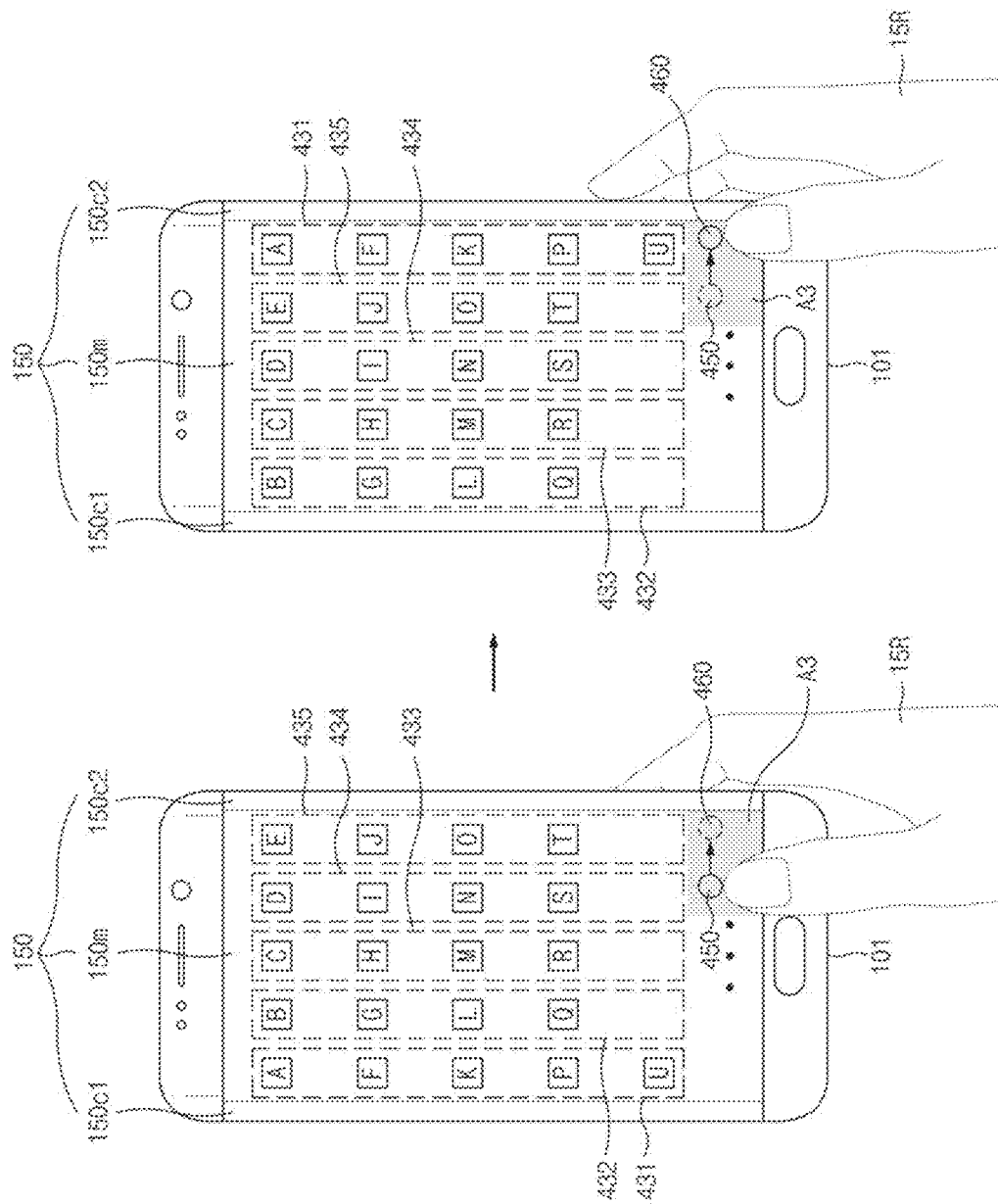

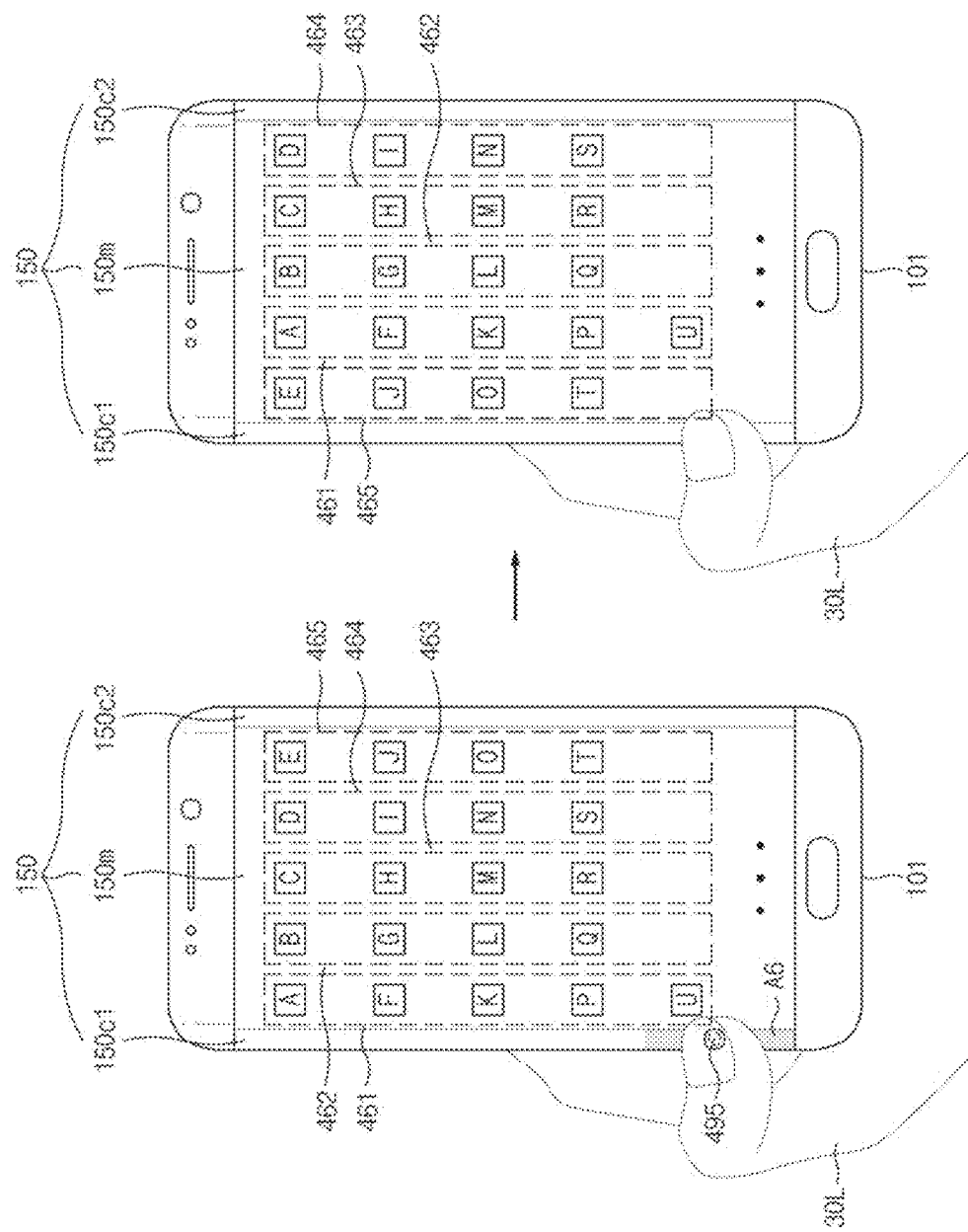

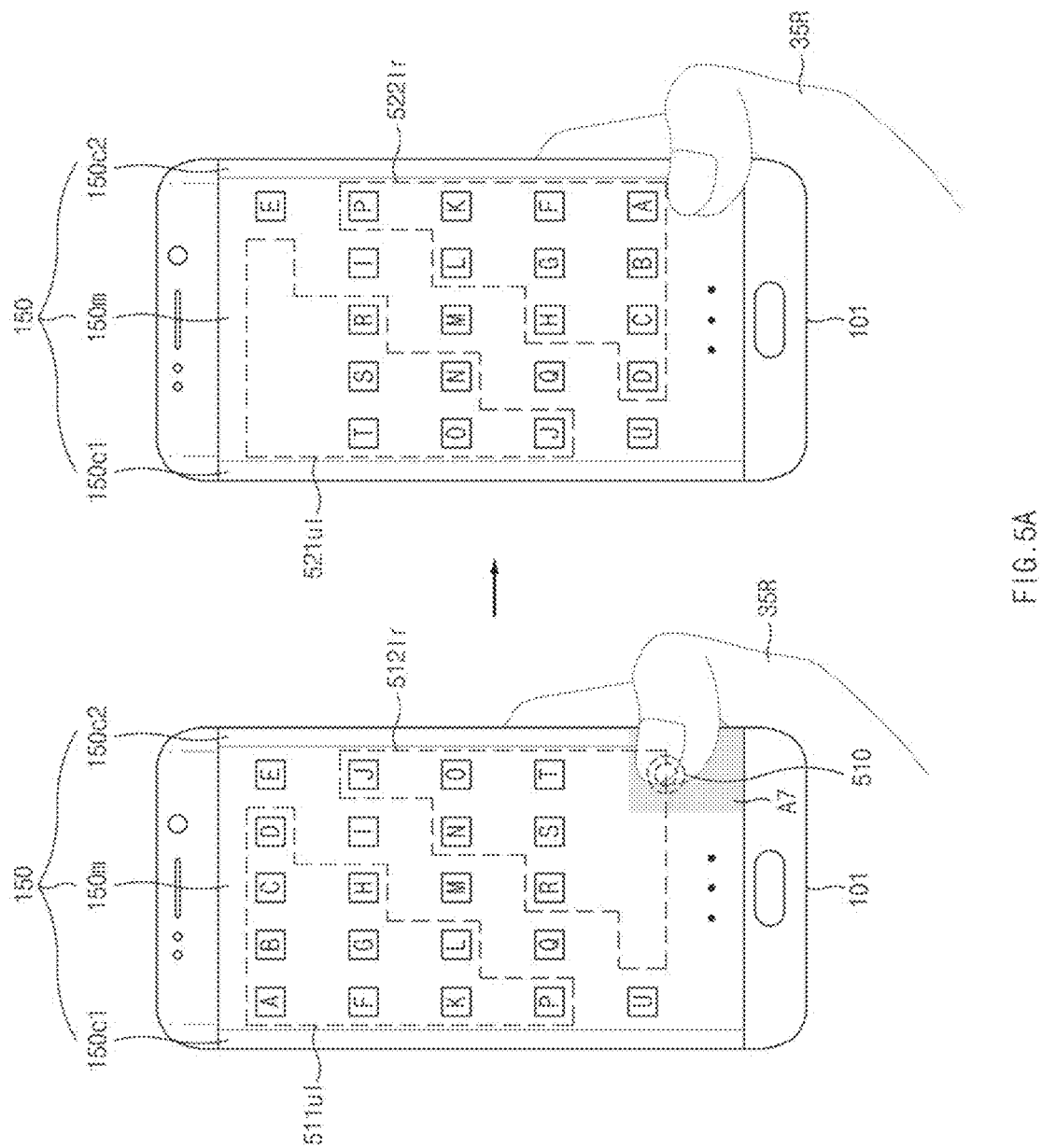

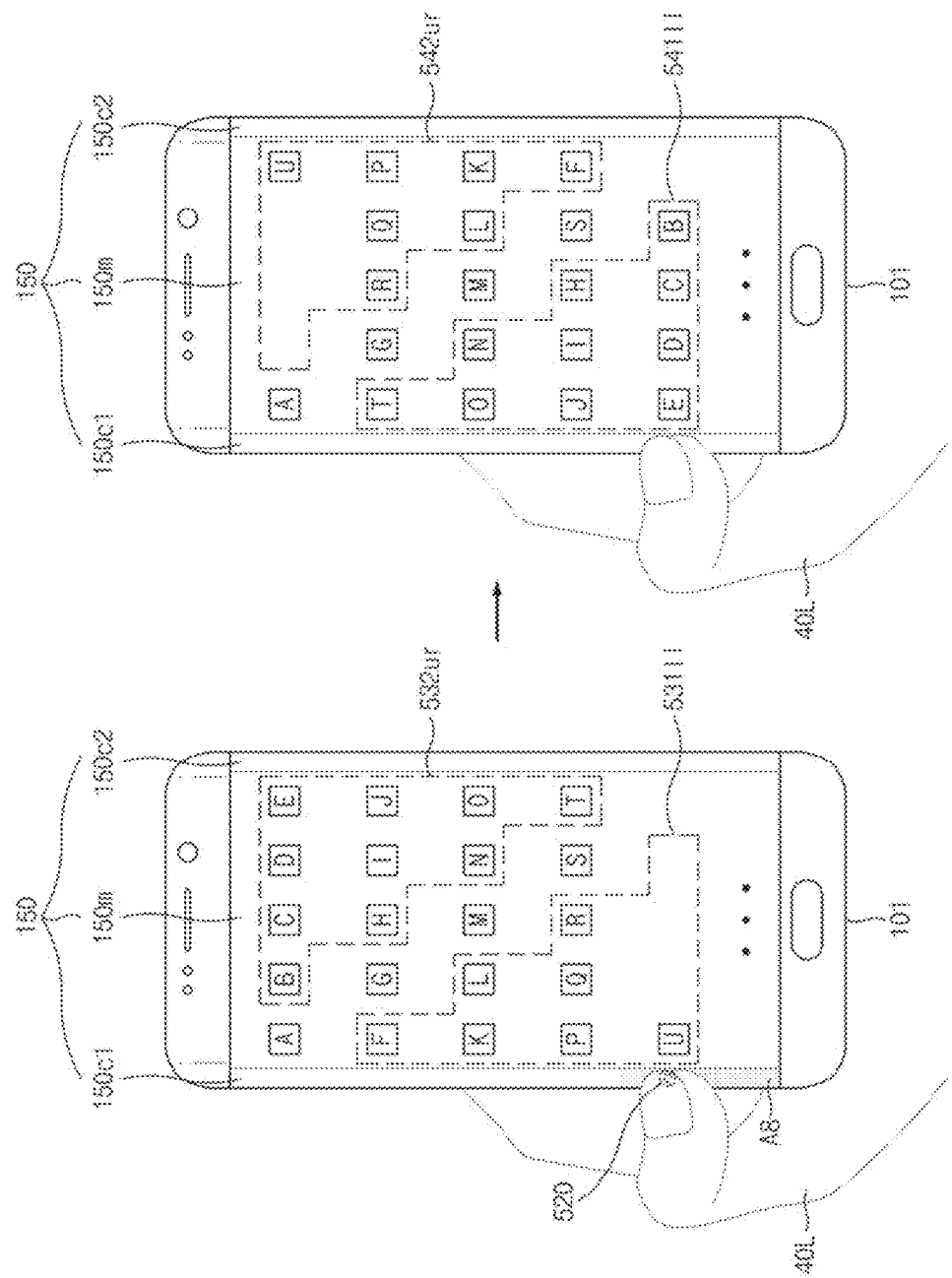

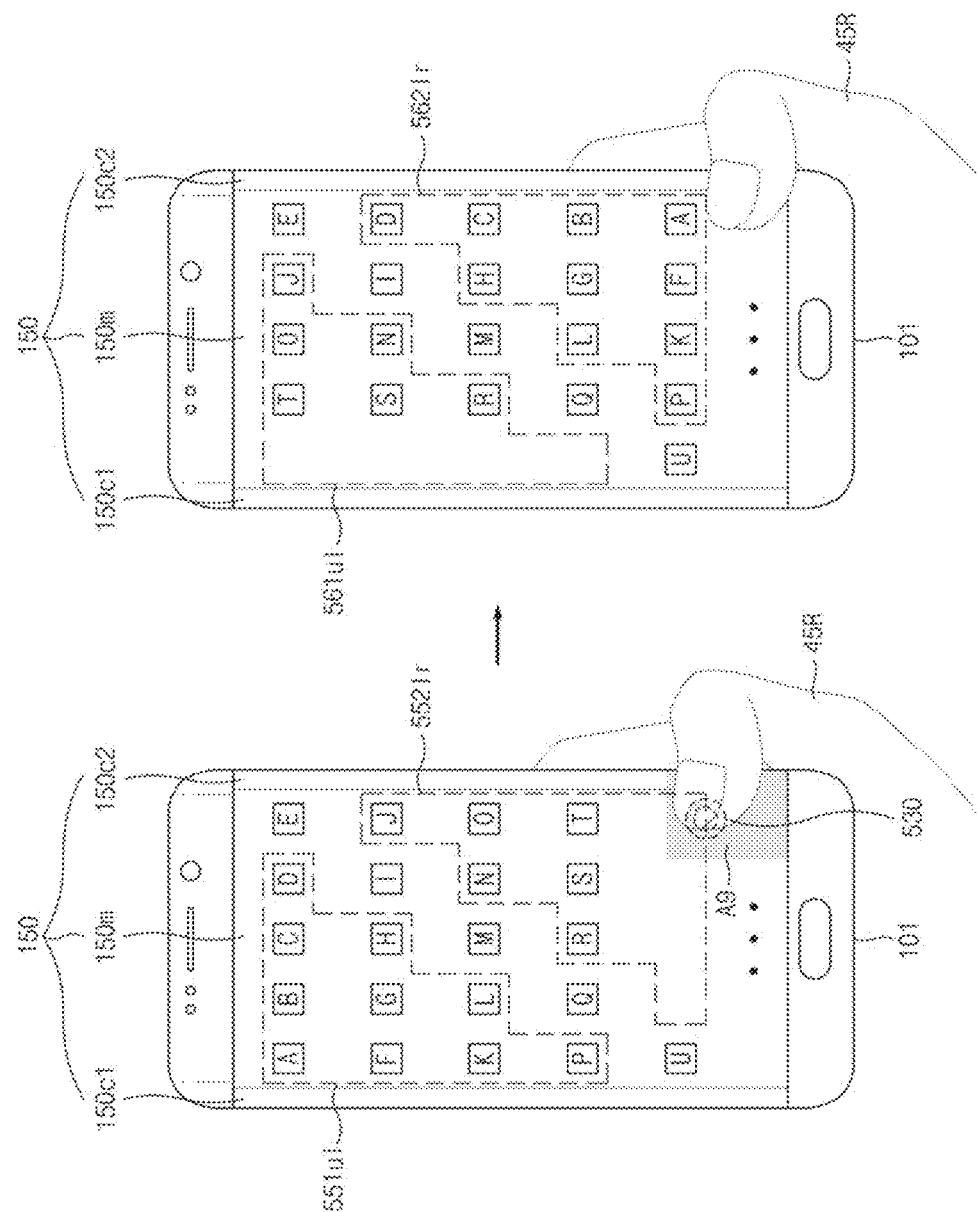

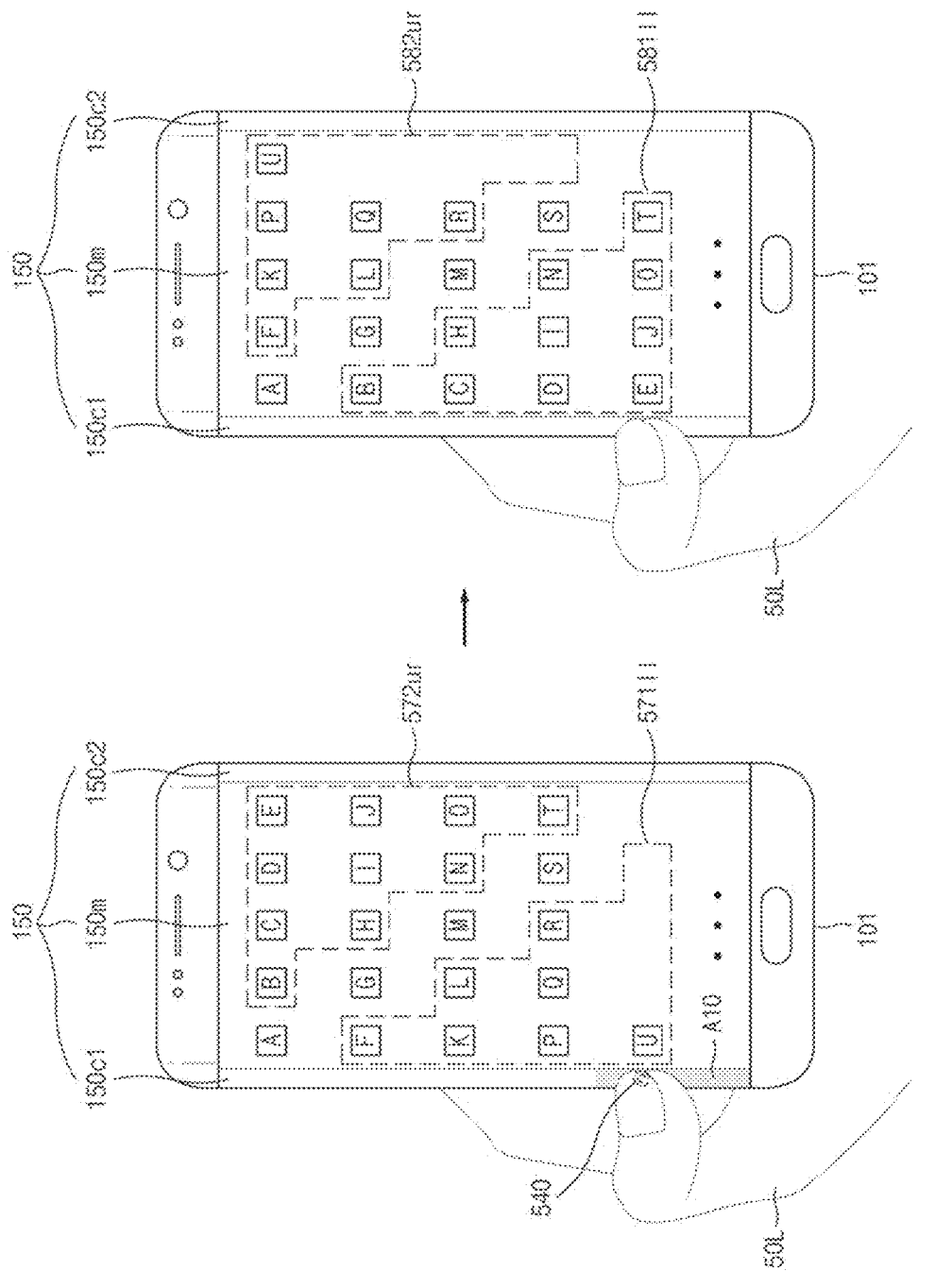

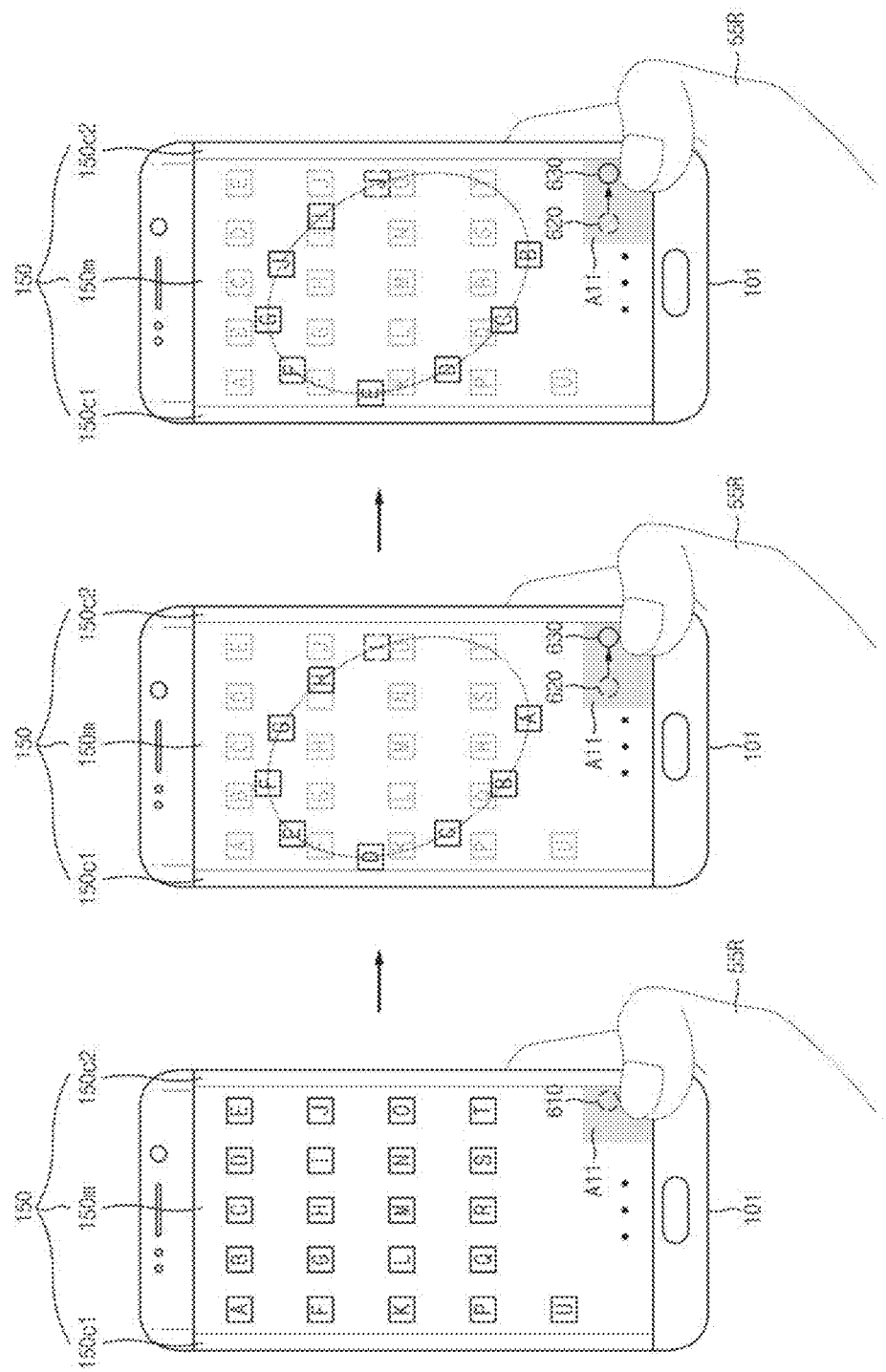

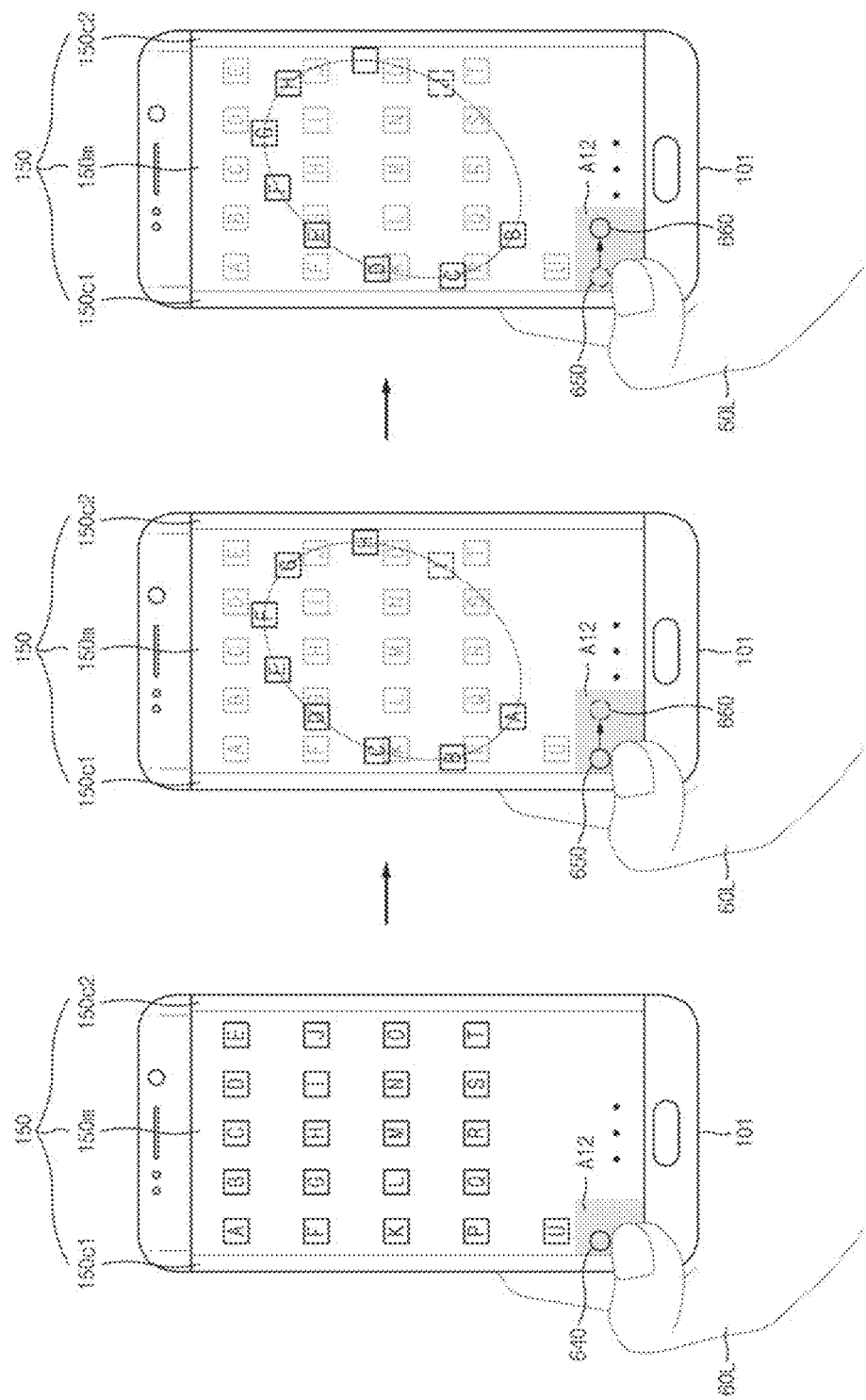

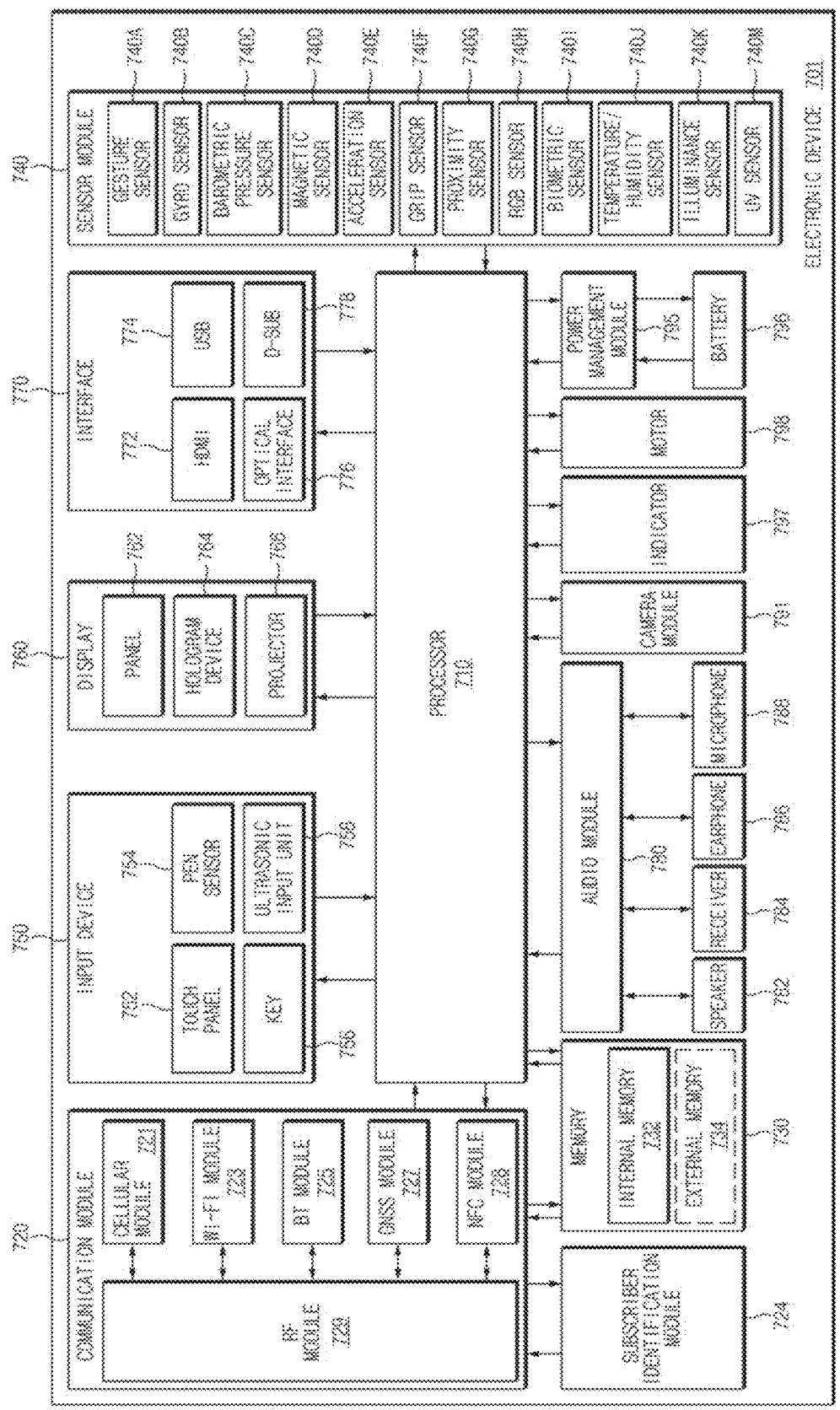

METHOD AND AN ELECTRONIC DEVICE FOR ONE-HAND USER INTERFACE

CROSS-REFERENCE TO RELATED APPLICATION(S) AND CLAIM OF PRIORITY

The present application is related to and claims the benefit under 35 U.S.C. § 119(a) of a Korean patent application filed on Jun. 29, 2015 in the Korean Intellectual Property Office and assigned Serial number 10-2015-0091938, the entire disclosure of which is hereby incorporated by reference.

TECHNICAL FIELD

The present disclosure relates to a method for implementing a one-hand user interface by rearranging objects of an application and an electronic device performing the same.

BACKGROUND

A portable electronic device, such as a smart phone, a wearable device, or the like, that are equipped with a display has been widely supplied since the spread of personal computers.

The display of the portable electronic device may be implemented with a so-called touch screen by using a resistive or capacitive touch panel. The display implemented with the touch screen may be used as an input device that receives a user manipulation, in addition to being used as a visual display device.

A size of the display mounted on the portable electronic device (e.g., a smart phone) tends to increase from about 3 inches to five inches or more due to a demand of a user who may want to have various functions on a larger screen.

A user may grip the portable electronic device with one hand and may perform various touch operations with the other hand as a method of using the portable electronic device (so-called two-hand operation). Alternatively, to use the portable electronic device, the user may grip the portable electronic device with one hand and may perform various touch operations with the same hand (so-called one-hand operation).

However, because a size of a display mounted on the portable electronic device may be large, it may not be easy for even a sturdy adult to operate the portable electronic device with one hand, not to mention a user, such as a child, having a relatively smaller hand.

SUMMARY

To address the above-discussed deficiencies, it is a primary object to provide a one-hand user interface method which rearranges and provides objects of an application based on a specific touch operation at a specific location and an electronic device performing the same.

In accordance with an aspect of the present disclosure, the electronic device includes a touch panel configured to receive a user input at a location, a display configured to output at least one object on at least one of a plurality of grid areas arranged in a plurality of rows and a plurality of columns, and a processor configured to rearrange an output location of the at least one object outputted on the at least one grid area in response to receiving the user input.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A to 4F illustrate an electronic device in which a one-hand user interface according to an embodiment of the present disclosure is implemented;

FIGS. 5A to 5D illustrate an electronic device in which a one-hand user interface according to another embodiment of the present disclosure is implemented;

FIGS. 6A and 6B illustrate an electronic device in which a one-hand user interface according to various embodiments of the present disclosure is implemented; and FIG. 7 illustrates an electronic device according to various embodiments of the present disclosure.

Throughout the drawings, it should be noted that like reference numbers are used to depict the same or similar elements, features, and structures.

DETAILED DESCRIPTION

Figure 1:
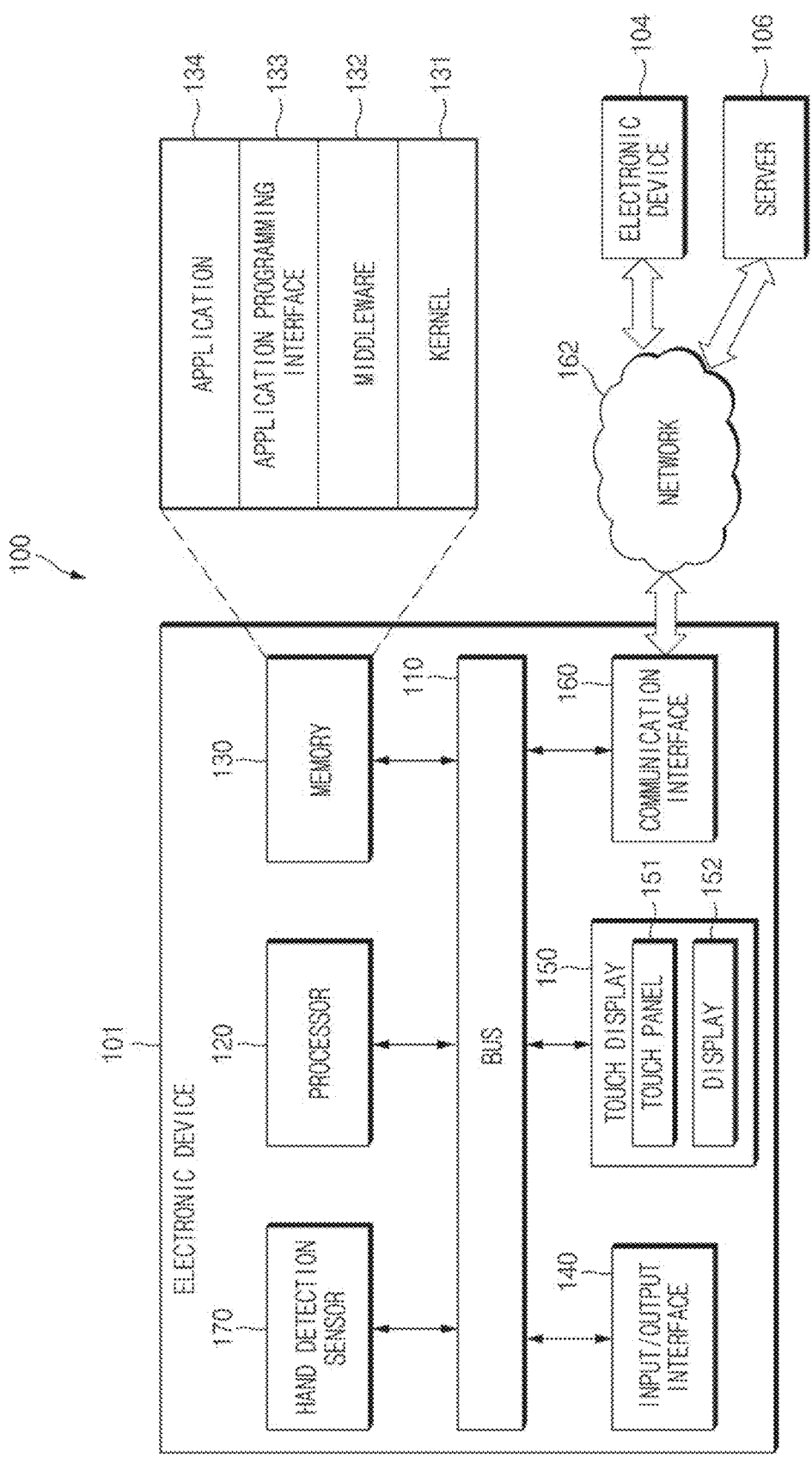
FIG. 1 illustrates an electronic device according to an embodiment of the present disclosure.

FIGS. 1 through 7, discussed below, and the various embodiments used to describe the principles of the present disclosure in this patent document are by way of illustration and should not be construed in any way to limit the scope of the disclosure. Those skilled in the art will understand that the principles of the present disclosure may be implemented in any suitably arranged electronic device. Hereinafter, various embodiments of the present disclosure may be described to be associated with accompanying drawings.

While various embodiments of the present disclosure are susceptible to various modifications and have several embodiments, specific embodiments thereof are shown by way of an example in the drawings and detailed descriptions thereof will be described. It should be understood, however, that there is no intent to limit the various embodiments of the present disclosure to the particular forms disclosed, but on the contrary, the disclosure is to cover all modifications, equivalents, and alternatives falling within the spirit and scope of the various embodiments of the present disclosure. With regard to description of drawings, similar elements may be marked by similar reference numerals.

The expressions "include" and "comprise" or "may include" and "may comprise" used in the various embodiments of the present disclosure indicate existence of corresponding features, operations, or elements disclosed herein but do not exclude additional one or more functions, operations, or elements. It will be further understood that the terms "comprises," "comprising," "includes," and/or "including," when used in the various embodiments of the present disclosure, specify the presence of stated features, numbers, steps, operations, elements, components, or groups thereof, but do not preclude the presence or addition of one or more other features, numbers, steps, operations, elements, components, and/or groups thereof.

In the various embodiments of the present disclosure, the expressions of "or", "at least one of A or/and B", or the like may include one or all combinations of the associated listed words. For example, the term "A or B" or "at least one of A and/or B" may refer to all of the case (1) where 'A' is included, the case (2) where 'B' is included, or the case (3) where both of 'A' and 'B' are included.

The terms, such as "first", "second", and the like used in the various embodiments of the present disclosure may refer to various elements of various embodiments, but do not limit the elements. For example, the terms may not limit order and/or priority of the elements. Furthermore, such terms may be used to distinguish one element from another element. For example, "a first user device" and "a second user device" may indicate all user devices and may indicate different user devices. For example, without departing the scope according to various embodiments of the present disclosure, a first element may be referred to as a second element, and similarly, a second element may be referred to as a first element.

It will be understood that when an element is referred to as being "connected" or "coupled" to the other element, the element can be directly connected or coupled to the other element or another new element may be present between the element and the other element. In contrast, when an element is referred to as being "directly connected" or "directly coupled" to another element, there are no another new element between the element and the other element.

The terminology used in the various embodiments of the present disclosure to describe a specific embodiment is not intended to limit the scope of the various embodiments of the present disclosure. The articles "a," "an," and "the" are singular in that they have a single referent, however the use of the singular form in the present disclosure should not preclude the presence of more than one referent.

Unless otherwise defined, all terms (including technical and scientific terms) used herein are to be interpreted as is customary in the art to which the various embodiments of the present disclosure belongs. It will be understood that terms used herein should be interpreted as having a meaning that is consistent with their meaning in the context of this disclosure and the relevant art and will not be interpreted in an idealized or overly formal sense unless expressly so defined in the various embodiments of the present disclosure.

An electronic device according to the various embodiments of the present disclosure may be a device that includes a communication function. For example, an electronic device may include at least one of smartphones, tablet personal computers (PCs), mobile phones, video telephones, electronic book readers, desktop PCs, laptop PCs, netbook computers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses, an electronic apparel, electronic bracelets, electronic necklaces, electronic appcessories, electronic tattoos, smart watches), or the like.

According to various embodiments, the electronic devices may be smart home appliances having a communication function. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync®, Apple TV®, or Google TV®), game consoles, electronic dictionaries, electronic keys, camcorders, electronic picture frames, or the like.

According to various embodiments, the electronic devices may include at least one of various medical devices (e.g., a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs) of financial institutions, or points of sales (POSs).

According to various embodiments, the electronic devices may include at least one of furniture having a communication function, parts of buildings/structures, electronic boards, electronic signature receiving devices, projectors, or various measuring instruments (e.g., water meters, electricity meters, gas meters, or wave meters, and the like). According to the various embodiments of the present disclosure, the electronic device may be one of the above-described various devices or a combination thereof. An electronic device according to the various embodiments of the present disclosure may be a flexible device. Furthermore, an electronic device according to the various embodiments of the present disclosure may not be limited to the above-described devices.

Hereinafter, an electronic device according to the various embodiments will be described with reference to the accompanying drawings. The term "user" used in the various embodiments may refer to a person who uses an electronic device or may refer to a device (e.g., an artificial intelligence electronic device) that uses an electronic device.

FIG. 1 illustrates an electronic device according to an embodiment of the present disclosure.

Referring to FIG. 1, an electronic device 101 included in a network environment 100 may include a bus 110, a processor 120, a memory 130, an input/output interface 140, a touch display 150, a communication interface 160 and a hand detection sensor 170.

The bus 110 may interconnect the above-described elements and may be a circuit for conveying communications (e.g., a control message) among the above-described elements.

The processor 120 may receive, for example, an instruction from the above-described elements (e.g., the memory 130, the input/output interface 140, the touch display 150, the communication interface 160, the hand detection sensor 170, and the like) through the bus 110, may interpret the received instruction, and may perform an arithmetic operation or data processing based on the interpreted instruction.

According to an embodiment, if a user input is received from a touch panel 151, the processor 120 may be configured to rearrange an output location of at least one object displayed on a display 152 in various ways and to output the rearranged object on the display 152.

Furthermore, according to an embodiment, the processor 120 may rearrange an output location of at least one object displayed on at least one grid area in various ways based on whether the user input is received and a detection result of the hand detection sensor 170.

Various methods of rearranging objects in the light of whether the user input is received and/or the detection result of the hand detection sensor 170 may be described in detail with reference to FIGS. 4A to 4F and 5A to 5D.

Furthermore, according to an embodiment, the processor 120 may arrange at least a part of the at least one object, which is outputted on the display 152, on a new layer along a perimeter of a specific shape in response to receiving a first user input from the touch panel 151. The new layer may be outputted on an existing layer (i.e., a layer on which the at least one object is outputted). According to an embodiment, a background of the new layer may be processed to be transparent or semi-transparent, or to have a specific transparency, and the existing layer may be outputted after being blurred.

If a second user input is received from the touch panel 151 after the new layer is outputted, the processor 120 may be set such that objects arranged along the perimeter of the specific shape are changed in a specific sequence. The new layer will be described in detail with reference to FIGS. 6A and 6B.

The memory 130 may store an instruction or data received from or generated by the processor 120 or other elements (e.g., the input/output interface 140, the touch display 150, the communication interface 160, the hand detection sensor 170, or the like). The memory 130 may include, for example, programming modules, such as a kernel 131, a middleware 132, an application programming interface (API) 133, an application 134, or the like. Each of the above-described programming modules may be implemented by software, firmware, hardware, or a combination of two or more thereof.

The kernel 131 may control or manage system resources (e.g., the bus 110, the processor 120, the memory 130, or the like) that are used to execute operations or functions of other programming modules (e.g., the middleware 132, the API 133, and the application 134). Furthermore, the kernel 131 may provide an interface that allows the middleware 132, the API 133, or the application 134 to access, control, or manage elements of the electronic device 101.

The middleware 132 may perform a mediation role such that the API 133 or the application 134 communicates with the kernel 131 to exchange data. Furthermore, with regard to task requests received from the application 134, for example, the middleware 132 may perform a control (e.g., scheduling or load balancing) on a task request using a method of assigning the priority, which makes it possible to use a system resource (e.g., the bus 110, the processor 120, the memory 130, or the like) of the electronic device 101, to at least one application of the applications 134.

The API 133 may be an interface through which the application 134 controls a function provided by the kernel 131 or the middleware 132, and may include, for example, at least one interface or function (e.g., an instruction) for a file control, a window control, image processing, a character control, or the like.

According to various embodiments, the application 134 may include an short message service (SMS)/multimedia messaging service (MMS) application, an e-mail application, a calendar application, an alarm application, a health care application (e.g., application for measuring an exercise quantity or blood sugar), an environmental information application (e.g., application for providing information of barometric pressure, humidity, or temperature), or the like. Additionally or alternatively, the application 134 may be an application related to information exchange between the electronic device 101 and an external electronic device (e.g., an electronic device 104). The application related to information exchange may include, for example, a notification relay application for transmitting specific information to the external electronic device or a device management application for managing the external electronic device.

For example, the notification relay application may include a function of transmitting notification information, which arises from other applications (e.g., applications for SMS/MMS, e-mail, health care, or environmental information) of the electronic device 101, to an external electronic device (e.g., the electronic device 104). Additionally or alternatively, the notification relay application may receive, for example, notification information from an external electronic device (e.g., the electronic device 104) and provide the notification information to a user. The device management application may manage (e.g., install, delete, or update), for example, at least a part of function (e.g., turn-on/turn-off of an external electronic device itself (or a part of components) or adjustment of brightness (or resolution) of a display) of an external electronic device (e.g., the electronic device 104) which communicates with the electronic device 101, an application running in the external electronic device, or a service (e.g., a call service or a message service) provided from the external electronic device.

According to various embodiments, the application 134 may include an application which is assigned in accordance with an attribute (e.g., a kind of an electronic device) of the external electronic device (e.g., the electronic device 104). For example, in the case where an external electronic device is an MP3 player, the application 134 may include an application associated with a music playback. Similarly, in the case where an external electronic device is a mobile medical device, the application 134 may include an application associated with a health management. According to an embodiment, the application 134 may include an application assigned to the electronic device 101 or at least one of applications received from an external electronic device (e.g., a server 106 or the electronic device 104).

The input/output interface 140 may provide an instruction or data inputted from a user through an input/output device (e.g., a sensor, a key board, or a touch screen) to the processor 120, the memory 130, the communication interface 160, or the hand detection sensor 170 through the bus 110, for example. For example, the input/output interface 140 may provide data about a user touch received through a touch screen to the processor 120. Furthermore, the input/ output interface 140 may output, for example, an instruction or data received from the processor 120, the memory 130, the communication interface 160, or the hand detection sensor 170 to the input/output device (e.g., a speaker or a display) through the bus 110. For example, the input/output interface 140 may output voice data processed by the processor 120 to a user through a speaker.

The touch display 150 may display a variety of data (e.g., multimedia data or text data) to a user or receive a touch input from the user. To this end, the touch display 150 according to an embodiment may include the touch panel 151 and the display 152.

The display 152 may include, for example, a liquid crystal display (LCD), a light-emitting diode (LED) display, an organic LED (OLED) display, or a microelectromechanical systems (MEMS) display, or an electronic paper display. The display 152 may display, for example, various content (e.g., a text, an image, a video, an icon, a symbol, or the like) to a user.

According to an embodiment, the display 152 may output at least one object on at least one of a plurality of grid areas that are arranged in a plurality of rows and columns. Furthermore, the display 152 may output an object rearranged according to various embodiments of the present disclosure. According to an embodiment, the plurality of grid areas (or lines defined by the plurality of grid areas) arranged in the plurality of rows and columns may not be outputted on the display 152 such that a user does not perceive the plurality of grid areas.

The object may include an icon or a widget of the application 134 stored in the memory 130. According to an embodiment, the number of the outputted objects may be the same as or different from the number of grid areas on which the corresponding objects are outputted respectively. For example, in the case where each of the outputted objects corresponds to an icon, the number of the outputted objects may be the same as the number of grid areas on which the corresponding objects are outputted respectively. In contrast, in the case where the outputted object includes a widget that occupies two or more grid areas, the number of the outputted objects may be different from the number of grid areas on which the corresponding objects are outputted respectively.

According to an embodiment, the display 152 may include a main display area and at least one sub-display area. The main display area may occupy most of the front side of the electronic device 101, and the at least one object may be outputted on the main display area. The at least one sub-display area may extend to a lateral side of the electronic device 101 from the main display area. For example, at least one sub-display area may be implemented with a curved display that is bent to the lateral side from the front side of the electronic device 101.

A size of the touch panel 151 may correspond to that of the display 152 and may be coupled on the display 152. For example, the touch panel 151 may receive a touch, gesture, proximity, or hovering input using an electronic pen or a portion of a user's body. The touch panel 151 may recognize a user input using at least one of capacitive, resistive, infrared, or ultrasonic methods.

According to an embodiment, the touch panel 151 may receive a user input at a specific area. For example, the user input may include a simple touch gesture, a double touch gesture, or a touch move gesture.

For example, a simple touch gesture may correspond to an operation in which a user touches a specific location of the touch panel 151 with a portion of the user's body (e.g., a finger or the like) and then releases the portion of the user's body within a short time. A double touch gesture may correspond to an operation in which a user performs the simple touch gesture twice within a specific time. Furthermore, a touch move gesture may be an operation in which a user touches a portion of the user's body on a first location of the touch panel 151, moves the touch from the first location to a second location that is spaced apart from the first location, and releases the touch from the second location.

Meanwhile, a specific area on which the user input is received may be included in an area that excludes an area, on which objects are outputted, of the output area (or display area) of the display 152.

For example, in a touch panel coupled with the display 152, the specific area may include an empty area between areas on each of which an object is outputted, a grid area, on which an object is not outputted, from among the plurality of grid areas, a corner area of an entire output area of the display 152, and a corner area that is arranged at an intersection of a first corner area and a second corner area of the entire display area (or a main display area) of the display 152. According to various embodiments, in the case where the display 152 includes a main display area and at least one sub-display area, the specific area may be included in the at least one sub-display area.

The specific area may be exemplary. The specific area that excludes an area on which objects are outputted may include an area that a user's hand gripping the electronic device 101 easily reaches. In addition, according to various embodiments, a user input about the specific area may include an input through a specific physical button, an input through a soft key, a voice input, or the like.

The communication interface 160 may establish communication between the electronic device 101 and an external device (e.g., the electronic device 104 or the server 106). For example, the communication interface 160 may be connected to a network 162 through wireless or wired communication to communicate with the external device. The wireless communication may include at least one of, for example, Wi-Fi®, Bluetooth® (BT), near field communication (NFC), global positioning system (GPS), or a cellular communication (e.g., long-term evolution (LTE), LTE-A, code division multiple access (CDMA), wideband CDMA (WCDMA), universal mobile telecommunications system (UMTS), wireless broadband (WiBro), or global system for mobile communications (GSM)). The wired communication may include at least one of, for example, a universal serial bus (USB), a high definition multimedia interface (HDMI), a recommended standard-232 (RS-232), or a plain old telephone service (POTS).

According to an embodiment, the network 162 may be a telecommunications network. The telecommunications network may include at least one of a computer network, an Internet, Internet of Things (IoT), or a telephone network. According to an embodiment, a protocol (e.g., transport layer protocol, data link layer protocol, or physical layer protocol) for communication between the electronic device 101 and an external device may be supported in at least one of the application 134, the API 133, the middleware 132, the kernel 131, or the communication interface 160.

The server 106 may support an operation of the electronic device 101 by performing at least one operation of operations (or functions) implemented in the electronic device 101.

The hand detection sensor 170 may determine whether a user's hand gripping the electronic device 101 is a right hand or a left hand. The hand detection sensor 170 may detect a user's hand gripping the electronic device 101 by using a capacitive element. According to an embodiment, a direction of a user's hand gripping the electronic device 101 may be detected by recognizing a user's hand and a user's finger touched on sub-display areas 150c1 or 150c2.

Figure 2:
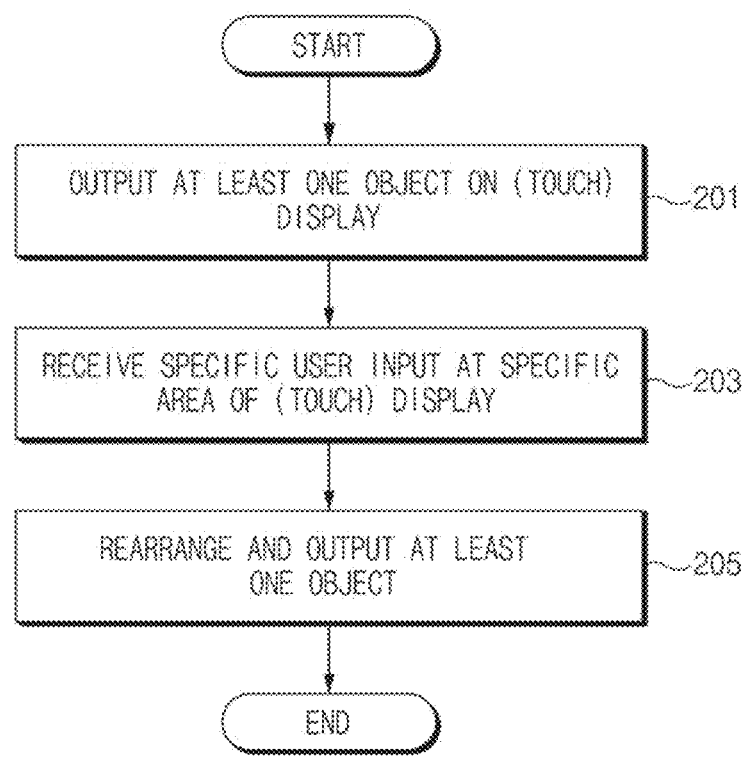
FIG. 2 illustrates a method for implementing a one-hand user interface, according to an embodiment of the present disclosure.

FIG. 2 illustrates a method for implementing a one-hand user interface, according to an embodiment of the present disclosure.

Referring to FIG. 2, a method for implementing a one-hand user interface of the electronic device 101 according to an embodiment of the present disclosure may include operations 201, 203, and 205.

In operation 201, the display 152 may output at least one object on at least one of a plurality of grid areas that are arranged in a plurality of rows and columns of an output area.

In operation 203, the touch panel 151 may receive a user input at a specific area. The specific area may be included in an area that excludes an area, on which objects are outputted, of an output area of the display 152 coupled with the touch panel 151. Furthermore, the user input may include a simple touch gesture, a double touch gesture, or a touch move gesture.

In operation 205, the processor 120 may rearrange the at least one object outputted on the at least one grid area in various ways based on the user input that is received in operation 203.

According to an embodiment, the processor 120 may rearrange an output location of at least one object outputted on the display 152 by changing an arrangement sequence of at least one row (or column) of a plurality of grid areas arranged in a plurality of rows and columns.

Furthermore, according to an embodiment, the processor 120 may rearrange an output location of at least one object by exchanging specific grid areas to be symmetric with each other. For example, the processor 120 may rearrange an output location of at least one object outputted on the display 152 by exchanging an upper-left grid area for a lower-right grid area in a plurality of grid areas arranged in a plurality of rows and columns or by exchanging an upper-right grid area for a lower-left grid area in a plurality of grid areas arranged in a plurality of rows and columns.

In this case, an upper-left grid area, a lower-left grid area, an upper-right grid area, and a lower-right grid area may be classified according to arrangement locations of a plurality of grid areas. For example, assuming that gird areas defined with "i" rows and "j" columns form an i-by-j matrix, the lower-left grid areas may correspond to a set of grid areas corresponding to elements each of which is at the m-th row and n-th column (m>n), wherein "m" is less than or equal to "i" and "n" is less than or equal to "j". Furthermore, the upper-right grid areas may correspond to a set of grid areas corresponding to elements each of which is at the m-th row and n-th column (m<n).

Furthermore, according to an embodiment, when a first user input is received from the touch panel 151, the processor 120 may arrange at least a part of the at least one object displayed on the display 152 on a new layer along a perimeter of a specific shape. If a second user input is received from the touch panel 151 after the new layer is outputted, the processor 120 may change objects arranged along the perimeter of the specific shape in a specific sequence (refer to FIGS. 6A and 6B).

Figure 3:
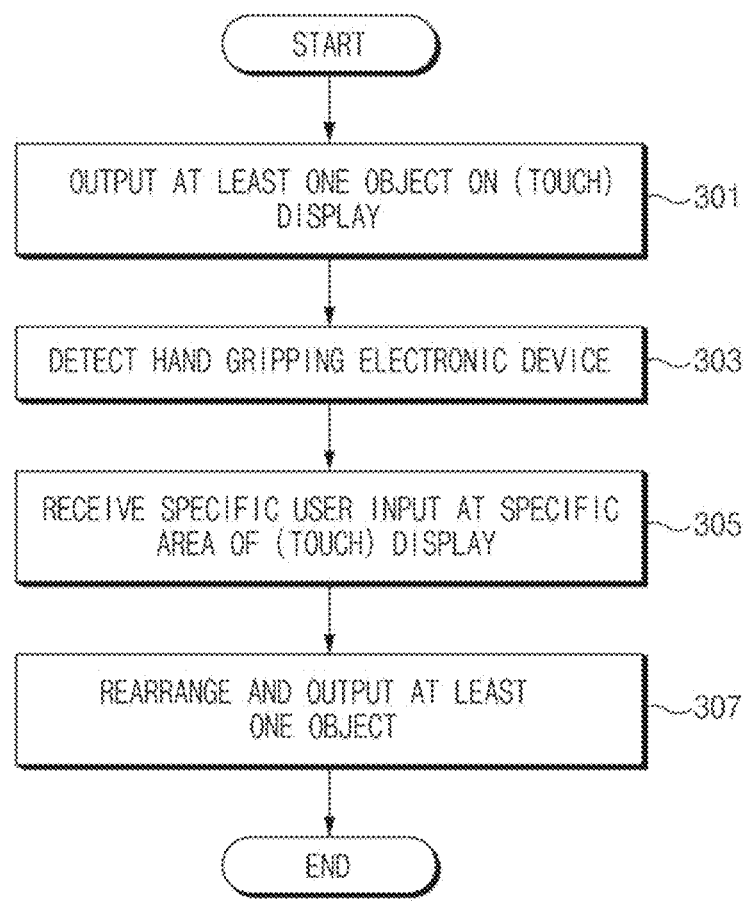
FIG. 3 illustrates a method for implementing a one-hand user interface, according to various embodiments of the present disclosure.

FIG. 3 illustrates a method for implementing a one-hand user interface, according to various embodiments of the present disclosure.

Referring to FIG. 3, a method for implementing a one-hand user interface for the electronic device 101 according to various embodiments of the present disclosure may include operations 301, 303, 305, and 307. With regard to FIG. 2, a duplicated description is omitted.

In operation 301, the display 152 may output at least one object on at least one of a plurality of grid areas that are arranged in a plurality of rows and columns of an output area.

In operation 303, the hand detection sensor 170 may determine whether a user's hand gripping the electronic device 101 is a right hand or a left hand. A grip sensor or the touch panel 151 using a capacitive element may be used as the hand detection sensor 170.

In operation 305, a user input may be received at a specific area of the touch display 150.

In operation 307, if the user input is received, the processor 120 may rearrange an output location of the at least one object outputted on the at least one grid area based on the user input and the hand detection result.

According to an embodiment, the processor 120 may move at least one row or column of a plurality of grid areas arranged in a plurality of rows and columns in a specific sequence based on the user input and the detection result of the hand detection sensor 170.

For example, if a hand gripping the electronic device 101 is determined as being a right hand and if the user input is received, the processor 120 may shift a column, which is farthest from the right hand, of columns of the plurality of grid areas to a column nearest to the right hand. In contrast, if a hand gripping the electronic device 101 is determined as being a left hand and if the user input is received, the processor 120 may shift a column, which is farthest from the left hand, of columns of the plurality of grid areas to a column nearest to the left hand. In other words, the processor 120 may rearrange objects outputted on the display 152 suitably for a user's hand gripping the electronic device 101.

Furthermore, according to an embodiment, the processor 120 may exchange specific gird areas symmetrically based on the user input and the detection result of the hand detection sensor 170.

For example, if a hand gripping the electronic device 101 is determined as being a right hand and if the user input is received, the processor 120 may exchange the upper-left grid area for the lower-right gird area in a plurality of grid areas arranged in a plurality of rows and columns. In contrast, if a hand gripping the electronic device 101 is determined as being a left hand and if the user input is received, the processor 120 may exchange the upper-right grid area for the lower-left gird area in a plurality of grid areas. In other words, the processor 120 may rearrange objects outputted on the display 152 suitably for a user's hand gripping the electronic device 101.

Furthermore, according to an embodiment, the processor 120 may arrange at least a part of the at least one object, which is displayed on the display 152, on a new layer along a perimeter of a specific shape based on the user input and the detection result of the hand detection sensor 170.

For example, if a hand gripping the electronic device 101 is determined as being a right hand and if the user input is received, the processor 120 may determine the specific shape as an elongated ellipse of which the major axis extends in upper-left and lower-right directions, such that the right hand easily reaches the object. In contrast, if a hand gripping the electronic device 101 is determined as being a left hand and if the user input is received, the processor 120 may determine the specific shape as an elongated ellipse of which the major axis extends in upper-right and lower-left directions, such that the left hand easily reaches the object. In other words, at least one object outputted on the display 152 may be arranged suitably for a user's hand gripping the electronic device 101.

FIGS. 4A to 4F illustrate an electronic device in which a one-hand user interface according to an embodiment of the present disclosure is implemented.

Figure 4A:
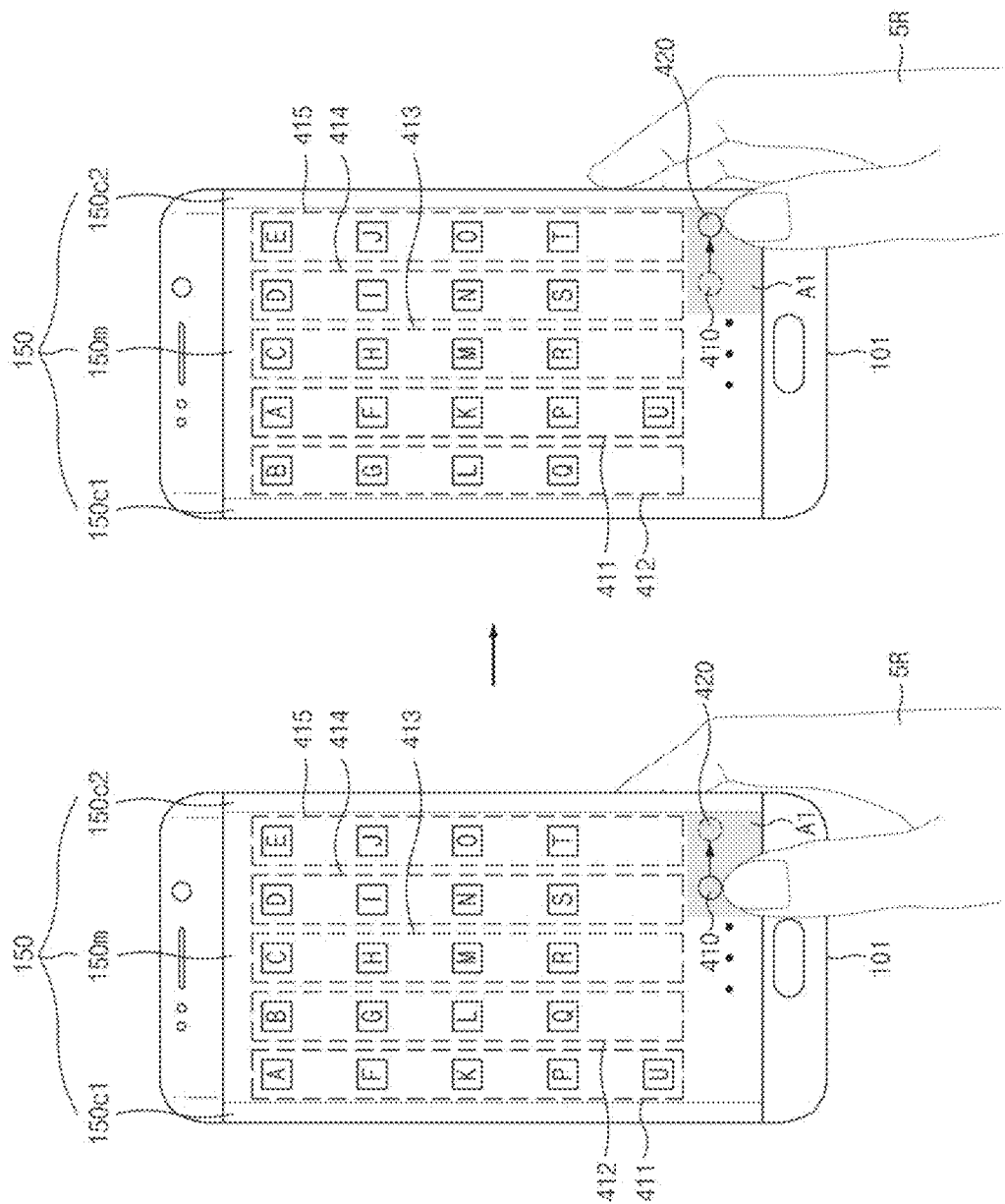

FIG. 4A illustrates the electronic device 101 in which a one-hand user interface according to an embodiment of the present disclosure is implemented. The touch display 150 of the electronic device 101 may include 25 discrete grid areas that constitute a 5-by-5 matrix. 21 objects (object A to object U) may be outputted on 21 grid areas of the 25 grid areas. Since objects before a user input are arranged in the same way as illustrated in FIGS. 4A to 4F, FIGS. 5A to 5D, and FIGS. 6A and 6B, a duplicated description about corresponding drawing is omitted.

A user may touch a thumb of the user's right hand 5R at a first location 410 and rightwards move the thumb to a second location 420 by a specific distance. The first and second locations 410 and 420 may be included in a specific area A1. The electronic device 101 may move a first column 411 (object A, object F, object K, object P, and object U) of columns 411 to 415 of the 25 grid areas in a specific sequence based on a touch move gesture. For example, the electronic device 101 may switch from the first column 411 to a second column 412 (a column including object B, object G, object L, object Q, and an empty grid area).

According to various embodiments, if the touch move gesture is performed several times, the electronic device 101 may switch the first column 411 (object A, object F, object K, object P, and object U) to the right by repeatedly switching the first column 411 the several times. For example, if the touch move gesture is performed three times, the first column 411 may be disposed at a fourth column 414.

Furthermore, according to various embodiments, if a touch move gesture from the second location 420 to the first location 410 is performed, the first column 411 may be switched to the left direction. For example, if a touch move gesture is performed three times from the first location 410 to the second location 420 and if a touch move gesture is performed once from the second location 420 to the first location 410, the first column 411 may be disposed at a third column 413.

Figure 4B:
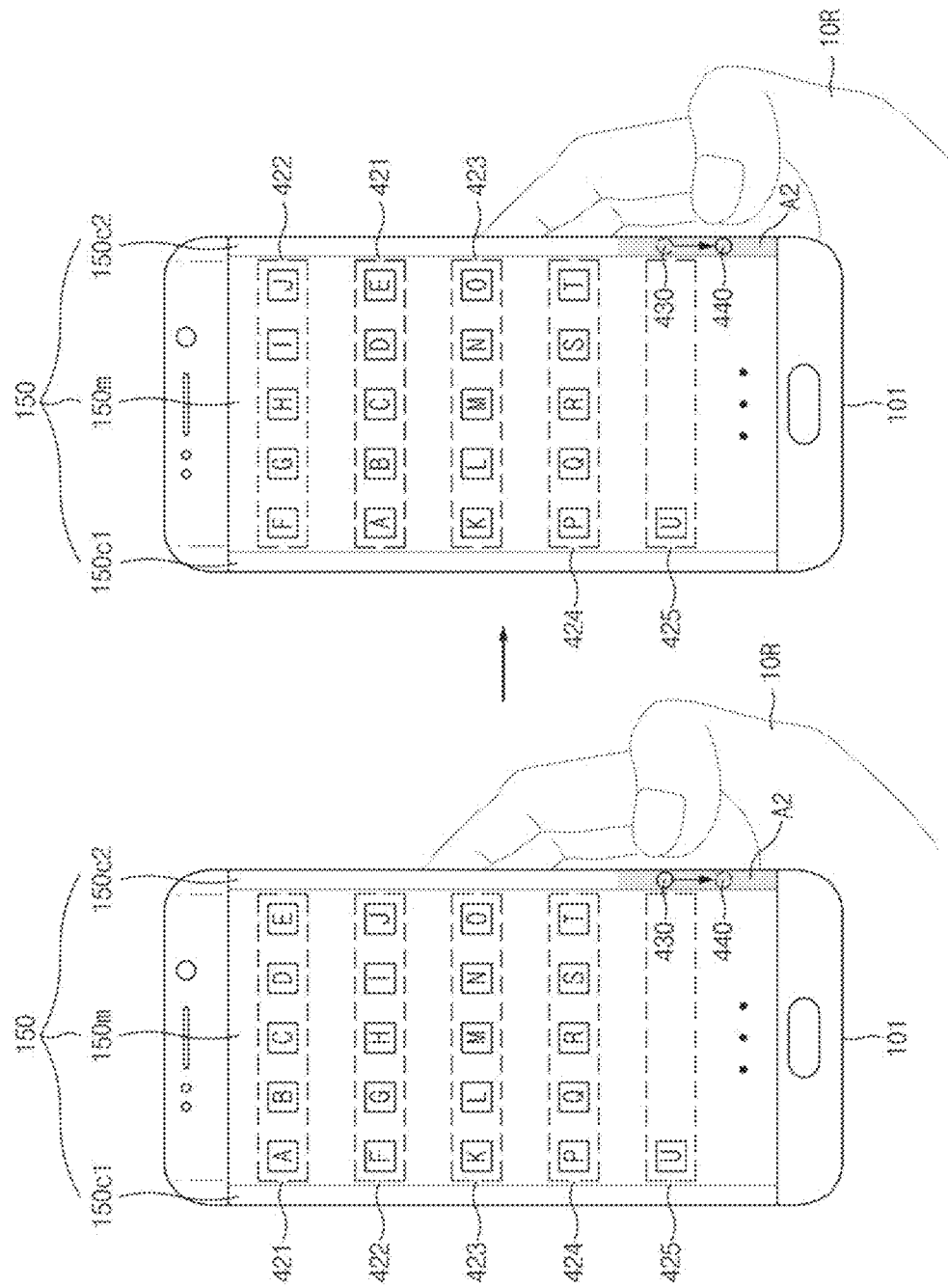

Referring to FIG. 4B, a user may touch a thumb of the user's right hand 10R at a first location 430 and move the thumb to a second location 440 downwardly by a specific distance. The first and second locations 430 and 440 may be included in a specific area A2 that is a portion of the sub-display area 150c2. The electronic device 101 may move a first row 421 (object A, object B, object C, object D, and object E) of rows 421 to 425 of the 25 grid areas in a specific sequence based on the touch move gesture. For example, the electronic device 101 may switch from the first row 421 to a second row 422 (object F, object G, object H, object I, and object J).

As in FIG. 4A, according to various embodiments, if the touch move gesture is performed several times, the electronic device 101 may move the first row 421 downwardly by repeatedly switching the first row 421 the several times. For example, if the touch move gesture is performed two times, the first row 421 may be disposed at a third row 423. Furthermore, according to various embodiments, if a touch move gesture from the second location 440 to the first location 430 is performed, the first row 421 may be moved upwardly.

An arrangement sequence of the row or the column, for example, a sequence for moving the row or the column, may be set in various ways. For example, referring to FIG. 4C, a user may touch a thumb of the user's right hand 15R at a first location 450 and rightwards move the thumb to a second location 460 by a specific distance. The first and second locations 450 and 460 may be included in a specific area A3. The electronic device 101 may change an arrangement sequence of five columns of 25 grid areas based on a touch move gesture. For example, the electronic device 101 may move a first column 431 (a column including object A, object F, object K, object P, and object U) to a location of a fifth column. In addition, the electronic device 101 may move second to fifth columns 432 to 435 to locations of first to fourth columns, respectively (i.e., the second to fifth columns 432 to 435 are shifted to the left).

According to various embodiments, if the touch move gesture is performed several times, the electronic device 101 may repeatedly move a column disposed at a location of a first column to a location of the fifth column and moves columns disposed at the second to fifth columns to locations of the first to fourth columns, respectively. For example, if the touch move gesture is performed two times, the first column 431 may move to the location of the fourth column, the second column 432 to the location of the fifth column, the third column 433 to the location of the first column, the fourth column 434 to the location of the second column, and the fifth column 435 to the location of the third column.

Furthermore, according to various embodiments, if a touch move gesture from the second location 460 to the first location 450 is performed, the electronic device 101 may move the fifth column 435 to the location of the first column. Accordingly, the first to fourth columns 431 to 434 may move to locations of the second to fifth columns, respectively (shifted to the right).

Figure 4D:
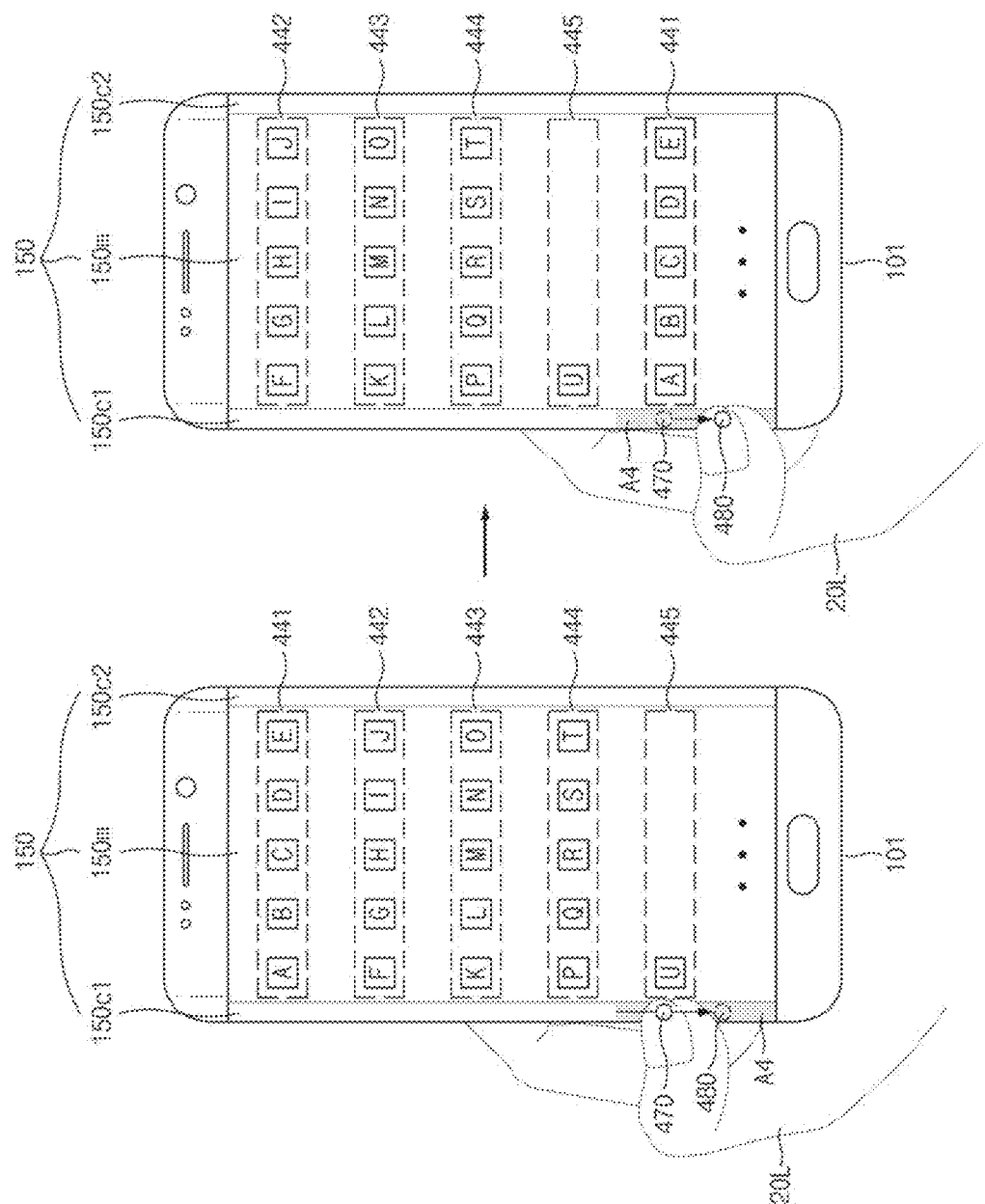

Referring to FIG. 4D, a user may touch a thumb of the user's left hand 20L at a first location 470 and move the thumb to a second location 480 downwardly by a specific distance. The first and second locations 470 and 480 may be included in a specific area A4. The area A4 may be included in the sub-display area 150c1. The electronic device 101 may change an arrangement sequence of five rows of 25 grid areas based on the touch move gesture. For example, the electronic device 101 may move a first row 441 to a location of a fifth row. In addition, the electronic device 101 may move locations of second to fifth rows 442 to 445 to locations of first to fourth rows, respectively. (The second to fifth rows 442 to 445 are shifted upwardly.)

According to various embodiments, if the touch move gesture is performed several times, the electronic device 101 may repeatedly move a row disposed at a location of the first row to a location of the fifth row and move rows disposed at locations of the second to fifth rows to locations of the first to fourth rows, respectively. For example, if the touch move gesture is performed two times, the first row 441 may move to the location of the fourth row, the second row 442 to the location of the fifth row, the third row 443 to the location of the first row, the fourth row 444 to the location of the second row, and the fifth row 445 to the location of the third row.

Furthermore, according to various embodiments, if a touch move gesture from the second location 480 to the first location 470 is performed, the electronic device 101 may move the fifth row 445 to the location of the first row. Accordingly, the first to fourth rows 441 to 444 may move to the locations of the second to fifth rows, respectively (shifted downwardly).

According to an embodiment, the processor 120 may change an arrangement sequence of at least one row or column of a plurality of grid areas arranged in a plurality of rows and columns based on the user input and the detection result of the hand detection sensor 170.

Figure 4E:
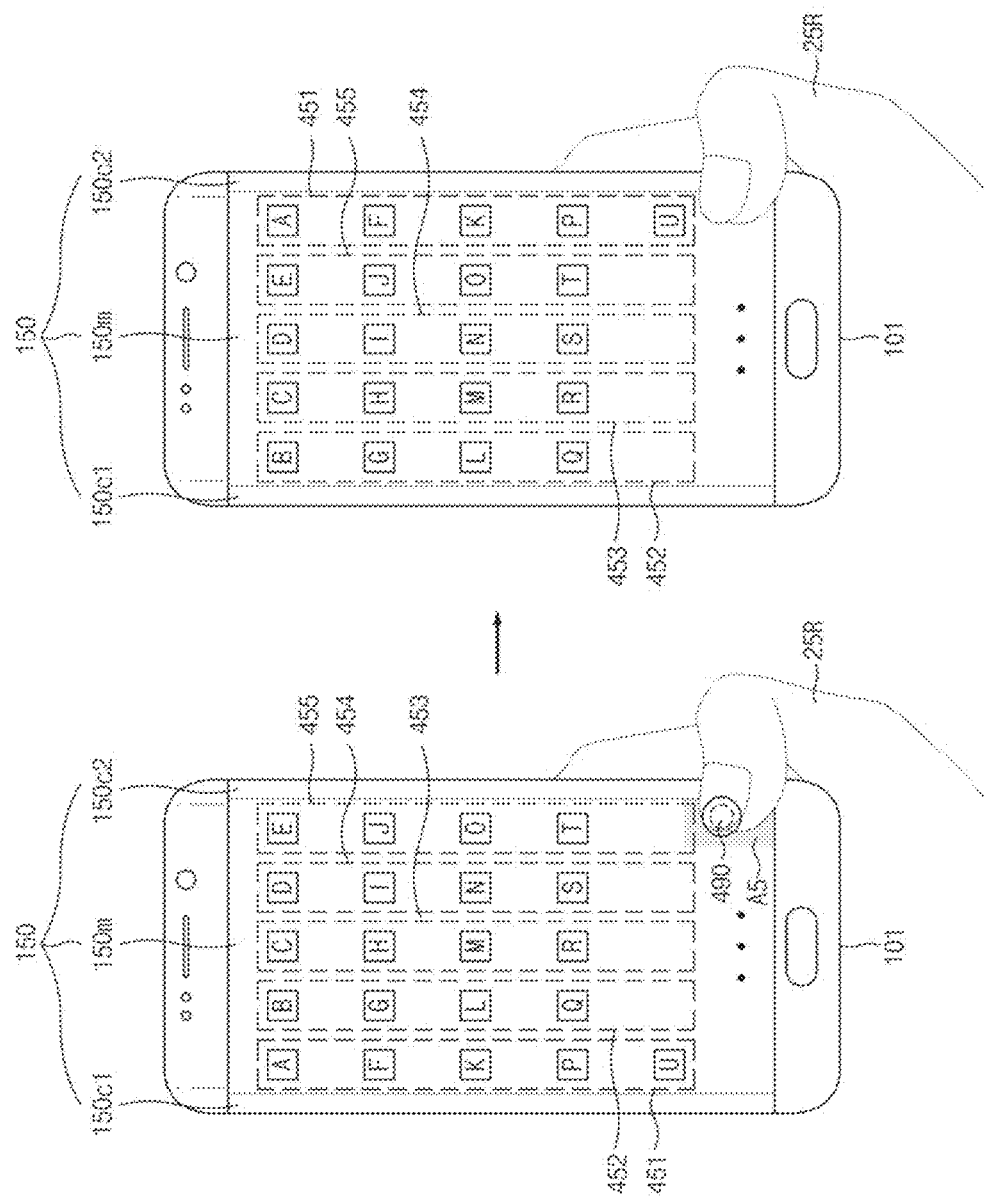

Referring to FIG. 4E, the user may perform a double touch gesture 490 on a specific area A5 with a thumb of the right hand 25R while a user grips the electronic device 101 with the user's right hand 25R. The hand detection sensor 170 of the electronic device 101 may detect the user's right hand 25R, and the touch panel 151 may receive the double touch gesture 490 at the specific area A5.

The electronic device 101 may change an arrangement sequence of five columns of 25 grid areas based on a direction of the detected hand (the right hand 25R) and the double touch gesture 490. For example, the electronic device 101 may move a first column 451 (a column including object A, object F, object K, object P, and object U) to a location of a fifth column. In addition, the electronic device 101 may move second to fifth columns 452 to 455 to locations of first to fourth columns, respectively (i.e., the second to fifth columns 452 to 455 are shifted to the left). Since an operation of shifting a column in FIG. 4E corresponds to an operation of shifting a column described in FIG. 4C, a duplicated description is omitted.

Referring to FIG. 4F, the user may perform a double touch gesture 495 on a specific area A6 with a thumb of the left hand 30L while a user grips the electronic device 101 with the user's left hand 30L. The area A6 may be included in the sub-display area 150c1. The hand detection sensor 170 of the electronic device 101 may detect the user's left hand 30L, and the touch panel 151 may receive the double touch gesture 495 at the specific area A6.

The electronic device 101 may change an arrangement sequence of five columns of 25 grid areas based on a direction of the detected hand (the left hand 30L) and the double touch gesture 495. For example, the electronic device 101 may move a fifth column 465 (a column including object E, object J, object O, object T, and an empty grid area) to a location of a first column. In addition, the electronic device 101 may move first to fourth columns 461 to 464 to locations of second to fifth columns, respectively (i.e., the first to fourth columns 461 to 464 are shifted to the right). Since an operation of shifting a column in FIG. 4F corresponds to a reverse operation of the operation of shifting a column described in FIGS. 4C and 4E, a corresponding description is omitted.

Even though an operation of moving one row or column is described with reference to FIGS. 4A to 4F, two or more rows and columns may be moved with one user input. Furthermore, a specific area on which the user input is received may be described as one of corner areas A1, A3, and A5 of the main display area 150m or one of areas A2, A4, and A6 included in sub-display areas 150c1 and 150c2. However, embodiments may not be limited thereto.

FIGS. 5A to 5D illustrate an electronic device in which a one-hand user interface according to an embodiment of the present disclosure is implemented.

Furthermore, according to an embodiment, the processor 120 of the electronic device 101 may exchange specific gird areas symmetrically based on a user input from the touch panel 151 and a detection result of the hand detection sensor 170.

Referring to FIG. 5A, the user may perform a double touch gesture 510 on a specific area A7 with a thumb of the right hand 35R while a user grips the electronic device 101 with the user's right hand 35R. The area A7 may be included in a corner area of the main display area 150m. The hand detection sensor 170 of the electronic device 101 may detect the user's right hand 35R, and the touch panel 151 may receive the double touch gesture 510 at the specific area A7.

The electronic device 101 may rearrange output locations of 21 objects outputted on the touch display 150 by exchanging upper-left grid areas 511ul for lower-right grid areas 512lr in 25 grid areas based on a direction of the detected hand (the right hand 35R) and the double touch gesture 510. In an embodiment of FIG. 5A, the upper-left grid areas 511ul and the lower-right grid areas 512lr may be exchanged in a point symmetry manner with respect to an object M disposed at a center of the 25 grid areas. The upper-left grid areas 511ul may correspond to lower-right grid areas 522lr after a point reflection in the object M. The lower-right grid areas 512lr may correspond to upper-left grid areas 521ul after a point reflection in the object M.

Referring to FIG. 5B, the user may perform a double touch gesture 520 on a specific area A8 with a thumb of the left hand 40L while a user grips the electronic device 101 with the user's left hand 40L. The area A8 may be included in the sub-display area 150c1. The hand detection sensor 170 of the electronic device 101 may detect the user's left hand 40L, and the touch panel 151 may receive the double touch gesture 520 at the specific area A8.

The electronic device 101 may rearrange output locations of 21 objects outputted on the touch display 150 by exchanging lower-left grid areas 531ll for upper-right grid areas 532ur in 25 grid areas based on a direction of the detected hand (the left hand 40L) and the double touch gesture 520. The lower-left grid areas 531ll and the upper-right grid areas 532ur may be exchanged in a point-symmetry manner around the object M disposed at the center of the 25 grid areas. The lower-left grid areas 531ll may correspond to upper-right grid areas 542ur after a point reflection in the object M. The upper-right grid areas 532ur may correspond to lower-left grid areas 541ll after a point reflection in the object M.

A method of exchanging the grid areas may be set in various ways. For example, if a plurality of grid areas, on which an object is outputted, is arranged in m-by-m matrix, the grid areas may be exchanged in a line symmetry manner.

Referring to FIG. 5C, the user may perform a double touch gesture 530 on a specific area A9 with a thumb of the right hand 45R while a user grips the electronic device 101 with the user's right hand 45R. The area A9 may be included in a corner area of the main display area 150m. The hand detection sensor 170 of the electronic device 101 may detect the user's right hand 45R, and the touch panel 151 may receive the double touch gesture 530 at the specific area A9.

The electronic device 101 may rearrange output locations of 21 objects outputted on the touch display 150 by exchanging upper-left grid areas 551ul for lower-right grid areas 552lr in 25 grid areas, which constitute a 5-by-5 matrix, based on a direction of the detected hand (the right hand 45R) and the double touch gesture 530. The upper-left grid areas 551ul and the lower-right grid areas 552lr may be exchanged in the line symmetry manner with respect to a secondary diagonal line defined by objects E, I, M, Q, and U. The upper-left grid areas 551ul may correspond to lower-right grid areas 562lr after a line reflection in the secondary diagonal line. The lower-right grid areas 552lr may correspond to upper-left grid areas 561ul after a line reflection in the secondary diagonal line.

Referring to FIG. 5D, the user may perform a double touch gesture 540 on a specific area A10 with a thumb of the left hand 50L while a user grips the electronic device 101 with the user's left hand 50L. The area A10 may be included in the sub-display area 150*c*1. The hand detection sensor 170 of the electronic device 101 may detect the user's left hand 50L, and the touch panel 151 may receive the double touch gesture 540 at the specific area A10.

The electronic device 101 may rearrange output locations of 21 objects outputted on the touch display 150 by exchanging lower-left grid areas 571*ll* for upper-right grid areas 572*ur* in 25 grid areas, which constitute a 5-by-5 matrix, based on a direction of the detected hand (the left hand 50L) and the double touch gesture 540. The lower-left grid areas 571*ll* and the upper-right grid areas 572*ur* may be exchanged in a line symmetry manner with respect to a main diagonal line defined by objects A, G, M and S. The lower-left grid areas 571*ll* may correspond to upper-right grid areas 582*ur* after a line reflection in the main diagonal line. The upper-right grid areas 572*ur* may correspond to lower-left grid areas 581*ll* after a line reflection in the main diagonal line.

FIGS. 6A and 6B illustrate an electronic device in which a one-hand user interface according to an embodiment of the present disclosure is implemented.

According to an embodiment, the processor 120 of the electronic device 101 may arrange at least a part of the at least one object, which is outputted on the display 152, along a perimeter of a specific shape based on a user input received from the touch panel 151 and a detection result of the hand detection sensor 170.

Referring to FIG. 6A, the user may perform a simple touch gesture 610 (a first user input) on a specific area A11 with a thumb of the right hand 55R while a user grips the electronic device 101 with the user's right hand 55R. The area A11 may be included in a corner area of the main display area 150*m*. The hand detection sensor 170 of the electronic device 101 may detect the user's right hand 55R, and the touch display 150 may receive the simple touch gesture 610 at the specific area A11.

The electronic device 101 may arrange at least a part (objects A to I) of 21 objects (object A to object U) outputted on the touch display 150 along the perimeter of a specific shape based on a direction of the detected hand (the right hand 55R) and the touch gesture 610 (the first user input) and may output new arrangement on the touch display 150 as a new layer.

According to an embodiment, as illustrated in FIG. 6A, the shape may be a shape (an elongated ellipse of which the major axis extends in upper-left and lower-right directions) set such that the detected right hand 55R easily reaches the object A.

A user may perform an operation (e.g., a second user input) in which the user touches a thumb of the user's right hand 55R at a first location 620 and rightwards moves the thumb to a second location 630 by a specific distance on the touch display 150. If the touch move gesture (the second user input) is received, the electronic device 101 may change the objects A to I arranged along a circumference of an ellipse in a counterclockwise direction. According to an embodiment, the second user input may correspond to an operation that is a touch and move operation in a clockwise or counterclockwise direction along the circumference of the ellipse.

According to an embodiment, an animation effect may be applied to each of the objects A to I arranged along the circumference of the ellipse. If the touch move gesture (the second user input) is received, the electronic device 101 (the processor 120 of the electronic device 101) may apply the animation effect in which an object A nearest to the user's right hand 55R disappears and an object J following object I, i.e., the last object is generated.

Referring to FIG. 6B, the user may perform the simple touch gesture 640 (a first user input) on a specific area A12 with a thumb of the left hand 60L while a user grips the electronic device 101 with the user's left hand 60L. The area A12 may be included in the sub-display area 150*c*1. The hand detection sensor 170 of the electronic device 101 may detect the user's left hand 60L, and the touch display 150 may receive a touch gesture 640 at the specific area A12.

The electronic device 101 may arrange at least a part (objects A to I) of 21 objects (object A to object U) outputted on the touch display 150 along the perimeter of a specific shape based on a direction of the detected hand (the left hand 60L) and the touch gesture 640 (the first user input) and may output new arrangement on the touch display 150 as a new layer.

According to an embodiment, as illustrated in FIG. 6A, the shape may be a shape (an elongated ellipse of which the major axis extends in lower-left and upper-right directions) set such that the detected left hand 60L easily reaches the object A.

A user may perform an operation (e.g., a second user input) in which the user touches a thumb of the user's left hand 60L at a first location 650 and rightwards moves the thumb to a second location 660 by a specific distance on the touch display 150. If the touch move gesture (the second user input) is received, the electronic device 101 may move the objects A to I arranged along a circumference of an ellipse in a counterclockwise direction. According to an embodiment, the second user input may correspond to an operation that is a touch and move operation in a clockwise or counterclockwise direction along the circumference of the ellipse.

In FIGS. 6A and 6B, the specific shape is described as being an ellipse. However, the specific shape may include a polygon, a circle, a spiral, or a parabola. Furthermore, in FIGS. 6A and 6B, embodiments are described as the specific shape is outputted on a display. However, the specific shape itself may not be outputted. In addition, embodiments are described as a new layer is generated over the existing layer based on the first user input. However, an arrangement of objects along a perimeter of a specific shape may be done on the existing layer without generation of a new layer.

According to various embodiments of the present disclosure, the processor 120 may suitably rearrange objects based on a user input and/or a direction of the detected hand. As such, a user may easily select objects arranged on an opposite side (i.e., a side corresponding to the other hand of a user gripping the electronic device 101) with a hand gripping the electronic device 101.

FIG. 7 illustrates an electronic device according to various embodiments.

Referring to FIG. 7, the electronic device 701 may include, for example, all or a part of the electronic device 101 illustrated in FIG. 1. The electronic device 701 may include one or more application processors (AP) 710, a communication module 720, a subscriber identification module (SIM) card 724, a memory 730, a sensor module 740, an input device 750, a display 760, an interface 770, an audio module 780, a camera module 791, a power management module 795, a battery 796, an indicator 797, and a motor 798.

The AP 710 (e.g., the processor 120 of FIG. 1) may drive, for example, an operating system (OS) or an application to control a plurality of hardware or software elements connected to the AP 710 and may process and compute a variety of data including multimedia data. The AP 710 may be implemented with a system on chip (SoC), for example. According to an embodiment, the AP 710 may further include a graphic processing unit (GPU) (not illustrated).

The communication module 720 (e.g., the communication interface 160 of FIG. 1) may transmit and receive data between the electronic device 701 (e.g., the electronic device 101 of FIG. 1) and other electronic devices connected through a network in communication. According to an embodiment, the communication module 720 may include a cellular module 721, a Wi-Fi module 723, a Bluetooth (BT) module 725, a global navigation satellite system (GNSS) module 727, a near field communication (NFC) module 728, and a radio frequency (RF) module 729.

The cellular module 721 may provide voice communication, video communication, a message service, an Internet service or the like, through a communication network (e.g., long-term evolution (LTE), LTE-A, code division multiple access (CDMA), wideband CDMA (WCDMA), universal mobile telecommunications system (UMTS), Wireless Broadband (WiBro), or global system for mobile communications (GSM)). Furthermore, the cellular module 721 may perform discrimination and authentication of an electronic device within a communication network using a subscriber identification module (e.g., a SIM card 724), for example. According to an embodiment, the cellular module 721 may perform at least part of functions that the AP 710 provides. For example, the cellular module 721 may perform at least part of a multimedia control function.

According to an embodiment, the cellular module 721 may include a communication processor (CP). Furthermore, the cellular module 721 may be implemented with a system on chip (SoC), for example. In FIG. 7, an embodiment of the present disclosure is exemplified as the cellular module 721 (e.g., a communication processor), the memory 730, the power management module 795, and the like are implemented as elements independent of the AP 710. However, according to an embodiment, the AP 710 may be implemented to include at least a part (e.g., the cellular module 721) of the above-described elements.

According to an embodiment, the AP 710 or the cellular module 721 (e.g., a communication processor) may load an instruction or data received from a nonvolatile memory connected to each of the AP 710 and the cellular module 721 or from at least one of other elements in a volatile memory and may process the loaded instruction or data. Furthermore, the AP 710 or the cellular module 721 may store data received from at least one of other elements or generated by at least one of other elements in a nonvolatile memory.

Each of the Wi-Fi module 723, the BT module 725, the GNSS module 727, and the NFC module 728 may include a processor for processing data exchanged through a corresponding module, for example. In FIG. 7, an embodiment of the present disclosure is exemplified as each of the cellular module 721, the Wi-Fi module 723, the BT module 725, the GNSS module 727, and the NFC module 728 is illustrated as a separate block. However, according to an embodiment, at least a part (e.g., two or more) of the cellular module 721, the Wi-Fi module 723, the BT module 725, the GNSS module 727, and the NFC module 728 may be included within one Integrated Circuit (IC) or an IC package. For example, at least a part (e.g., a communication processor corresponding to the cellular module 721 and a Wi-Fi processor corresponding to the Wi-Fi module 723) of processors corresponding to the cellular module 721, the Wi-Fi module 723, the BT module 725, the GNSS module 727, and the NFC module 728, respectively, may be implemented with a system on chip (SoC).

The RF module 729 may transmit and receive data, for example, an RF signal. Although not illustrated, the RF module 729 may include a transceiver, a power amplifier module (PAM), a frequency filter, low noise amplifier (LNA), or the like. Furthermore, the RF module 729 may further include a component, for example, a conductor or a wire, for transmitting and receiving electromagnetic waves in free space in wireless communication. In FIG. 7, an embodiment of the present disclosure is illustrated as the cellular module 721, the Wi-Fi module 723, the BT module 725, the GNSS module 727, and the NFC module 728 share one RF module 729. However, according to an embodiment, at least one of the cellular module 721, the Wi-Fi module 723, the BT module 725, the GNSS module 727, or the NFC module 728 may transmit and receive an RF signal through a separate RF module.

The SIM card 724 may be a card that includes a subscriber identification module and may be inserted into a slot formed at a specific location of an electronic device. The SIM card 724 may include unique identification information (e.g., integrated circuit card identifier (ICCID)) or subscriber information (e.g., integrated mobile subscriber identity (IMSI)).

The memory 730 (e.g., the memory 130 of FIG. 1) may include an internal memory 732 or an external memory 734. For example, the internal memory 732 may include at least one of a volatile memory (e.g., a dynamic random access memory (DRAM), a static RAM (SRAM), or a synchronous DRAM (SDRAM)), or a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an embodiment, the internal memory 732 may be a solid state drive (SSD). The external memory 734 may further include a flash drive, for example, compact flash (CF), secure digital (SD), micro secure digital (Micro-SD), mini secure digital (Mini-SD), extreme digital (xD), a memory stick, or the like. The external memory 734 may be functionally connected to the electronic device 701 through various interfaces. According to an embodiment, the electronic device 701 may further include a storage device (or a storage medium), such as a hard drive.

The sensor module 740 (e.g., the hand detection sensor 170 of FIG. 1) may measure, for example, a physical quantity or may detect an operation state of the electronic device 701. The sensor module 740 may convert the measured or detected information to an electric signal. The sensor module 740 may include at least one of a gesture sensor 740A, a gyro sensor 740B, a barometric sensor 740C, a magnetic sensor 740D, an acceleration sensor 740E, a grip sensor 740F, a proximity sensor 740G, a color sensor 740H (e.g., red, green, blue (RGB) sensor), a biometric sensor 740I, a temperature/humidity sensor 740J, an illuminance sensor 740K, or an UV sensor 740M. Additionally or alternatively, the sensor module 740 may further include, for example, an E-nose sensor (not illustrated), an electromyography sensor (EMG) sensor (not illustrated), an electroencephalogram (EEG) sensor (not illustrated), an electrocardiogram (ECG) sensor (not illustrated), an infrared (IR) sensor (not illustrated), an iris sensor (not illustrated), and/or a fingerprint sensor (not illustrated). The sensor module 740 may further include a control circuit for controlling at least one or more sensors included therein.

The input device 750 may include, for example, a touch panel 752 (e.g., the touch panel 151), a (digital) pen sensor 754, a key 756, or an ultrasonic input device 758. The touch panel 752 may recognize a touch input using at least one of capacitive, resistive, infrared, or ultrasonic methods. Also, the touch panel 752 may further include a control circuit. In the case of a capacitive method, it may be possible to recognize a physical contact or proximity. The touch panel 752 may further include a tactile layer. In this case, the touch panel 752 may provide a tactile reaction to a user.

The (digital) pen sensor 754 may be, for example, implemented with a method that is the same as or similar to that receives a user input or with an additional sheet for recognition. The key 756 may include, for example, a physical button, an optical key, a keypad, or the like. The ultrasonic input device 758 may detect (or sense) an ultrasonic signal, which is generated from an input device, through a microphone (e.g., a microphone 788) and may verify data corresponding to the detected ultrasonic signal. In the ultrasonic input device 758, wireless recognition may be possible. According to an embodiment, the electronic device 701 may receive a user input from an external device (e.g., a computer or a server) connected with the electronic device 701 through the communication module 720.

The display 760 (e.g., the display 152 of FIG. 1) may include a panel 762, a hologram device 764, or a projector 766. The panel 762 may be, for example, a liquid crystal display (LCD), an active-matrix organic light emitting diode (AM-OLED), or the like. The panel 762 may be implemented, for example, to be flexible, transparent or wearable. The panel 762 and the touch panel 752 may be integrated into a single module. The hologram device 764 may display a stereoscopic image in a space using a light interference phenomenon. The projector 766 may project light onto a screen so as to display an image. The screen may be arranged in the inside or the outside of the electronic device 701. According to an embodiment, the display 760 may further include a control circuit for controlling the panel 762, the hologram device 764, or the projector 766.

The interface 770 (e.g., the input/output interface 140 of FIG. 1) may include, for example, an high-definition multimedia interface (HDMI) 772, a universal serial bus (USB) 774, an optical interface 776, or a D-subminiature (D-sub) 778. Additionally or alternatively, the interface 770 may include, for example, a mobile high definition link (MHL) interface, a secure Digital (SD) card/multi-media card (MMC) interface, or an infrared data association (IrDA) standard interface.

The audio module 780 may convert a sound and an electric signal in dual directions. The audio module 780 may process, for example, sound information that is inputted or outputted through a speaker 782, a receiver 784, an earphone 786, or the microphone 788.

According to an embodiment, the camera module 791 for shooting a still image or a video may include, for example, at least one or more image sensors, a lens (not illustrated), an image signal processor (ISP) (not illustrated), or a flash (e.g., an LED or a xenon lamp) (not illustrated).

The power management module 795 may manage power of the electronic device 701. Even though not illustrated, a power management integrated circuit (PMIC), a charger IC, or a battery or fuel gauge may be included in the power management module 795.

The PMIC may be implemented, for example, in an integrated circuit or a SoC semiconductor. A charging method may be divided into wired and wireless. The charger IC may charge a battery or may prevent overvoltage or overcurrent from being inputted from the charger. According to an embodiment, the charger IC may include a charger IC for at least one of a wired charging method or a wireless charging method. The wireless charging method may include, for example, a magnetic resonance method, a magnetic induction method or an electromagnetic method and may further include an additional circuit, for example, a coil loop, a resonant circuit, a rectifier, or the like.

The battery gauge may measure, for example, a remaining capacity of the battery 796 and a voltage, current or temperature thereof while the battery is charged. The battery 796 may store or generate the electricity and may provide a power to the electronic device 701 using the stored or generated electricity. The battery 796 may include, for example, a rechargeable battery and/or a solar battery.

The indicator 797 may display a specific state of the electronic device 701 or a part thereof (e.g., the AP 710), such as a booting state, a message state, a charging state, or the like. The motor 798 may convert an electrical signal into a mechanical vibration. Although not illustrated, a processing device (e.g., a GPU) for supporting a mobile TV may be included in the electronic device 701. A processing device for supporting the mobile TV may process media data according to the standards of digital multimedia broadcasting (DMB), digital video broadcasting (DVB), Media-FLO®, or the like.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used according to various embodiments of the present disclosure may represent, for example, a unit including one or more combinations of hardware, software and firmware. For example, the term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific IC (ASIC) chip, a field-programmable gate array (FPGA), and a programmable-logic device for performing some operations, which are known or will be developed.

According to various embodiments of the present disclosure, at least a portion of an apparatus (e.g., modules or functions thereof) or a method (e.g., operations) may be, for example, implemented by instructions stored in a computer-readable storage media in the form of a programming module. The instruction, when executed by one or more processors (e.g., the processor 120 of FIG. 1), may cause the one or more processors to perform a function corresponding to the instruction. The computer-readable storage media, for example, may be the memory 130. At least a portion of the programming module may be implemented (e.g., executed), for example, by the processor 120. At least a portion of the programming module may include, for example, a module, a program, a routine, sets of instructions, or a process for performing one or more functions.

The computer-readable storage media may include a hard disk, a magnetic media (e.g., a floppy disk and a magnetic tape), an optical media (e.g., a compact disc read only memory (CD-ROM) and a digital versatile disc (DVD)), a magneto-optical media (e.g., a floptical disk), and hardware devices (e.g., a read only memory (ROM), a random access memory (RAM), or a flash memory) that are specially configured to store and perform program instructions (e.g., the programming module). Also, the program instructions may include not only a mechanical code such as things generated by a compiler but also a high-level language code executable on a computer using an interpreter. The above-mentioned hardware devices may be configured to operate as one or more software modules to perform operations according to various embodiments of the present disclosure, and vice versa.

Modules or programming modules according to various embodiments of the present disclosure may include at least one or more of the above-mentioned elements, some of the above-mentioned elements may be omitted, or other additional elements may be further included therein. Operations executed by modules, programming modules, or other elements according to various embodiments of the present disclosure may be executed by a successive method, a parallel method, a repeated method, or a heuristic method. Also, a part of operations may be executed in different sequences, omitted, or other operations may be added.

According to various embodiments, in a storage medium storing instructions, when executed by at least one processor, the instructions may be set to allow at least one processor to perform at least one operation. The at least one operation may include outputting at least one object on at least one grid area of a plurality of grid areas arranged in a plurality of rows and columns of the touch display 150, receiving a user input at a specific location of the touch display 150, and rearranging the at least one object outputted on the at least one grid area in response to receiving the user input.

An electronic device according to various embodiments of the present disclosure may suitably rearrange objects based on a user input and/or a direction of a hand gripping the electronic device. As such, a user may easily access objects arranged at an opposite side (i.e., a side corresponding to the other hand of a user gripping an electronic device) with a hand gripping an electronic device.

The effects that are achieved through various embodiments of the present disclosure may not be limited to what has been particularly described herein, and other advantages not described herein may be more clearly understood from the following detailed description by persons skilled in the art.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:
   a touch screen;
   at least one sensor;
   at least one memory storing instructions; and
   a processor configured to execute the instructions to:
      control the touch screen to display a plurality of objects related to a plurality of applications,
      detect whether a user is gripping the electronic device with a right hand or a left hand via the at least one sensor,
      in response to the detected result and a first user input on a specified area, control the touch screen to display the plurality of objects on a circular shape on the touch screen while the user is grasping the electronic device, and
      in response to a second user input, move at least part of the plurality of objects along a perimeter of the circular shape.

2. The electronic device of claim 1, wherein the processor is further configured to:
   control the touch screen to display the plurality of objects related to the plurality of applications on at least one grid area of a plurality of grid areas arranged in a plurality of rows and a plurality of columns.

3. The electronic device of claim 1, wherein the processor is configured to rearrange an output location of the plurality of objects based on the detected user's hand gripping the electronic device.

4. The electronic device of claim 1, wherein the circular shape includes a circle, an ellipse, a spiral, or a parabola.

5. The electronic device of claim 1, wherein the first user input comprises a gesture of touching a finger of a user's hand at a first location on the touch screen and moving the finger to a second location on the touch screen thereof spaced apart from the first location by a distance.

6. The electronic device of claim 1, wherein the first user input comprises a touch or a double touch gesture in the specified area.

7. The electronic device of claim 1, wherein the specified area of the touch screen excludes an area on which the plurality of objects is displayed.

8. The electronic device of claim 1, wherein the touch screen comprises:
   a main display area on which the plurality of objects is outputted; and
   at least one sub-display area extending to a lateral side of the electronic device from the main display area,
   wherein the specified area on which the first user input is received is included in the at least one sub-display area.

9. A method for implementing a one-hand user interface in an electronic device, the method comprising:
   displaying a plurality of objects related to a plurality of applications on a touch screen of the electronic device;
   detecting whether a user is gripping the electronic device with a right hand or a left hand;
   in response to the detected result and a first user input on a specified area, displaying the plurality of objects on a circular shape on the touch screen while the user is grasping the electronic device; and
   in response to a second user input, moving at least part of the plurality of objects along a perimeter of the circular shape.

10. The method of claim 9, wherein displaying a plurality of objects related to a plurality of applications comprises:
    displaying the plurality of objects related to the plurality of applications on at least one grid area of a plurality of grid areas arranged in a plurality of rows and a plurality of columns.

11. The method of claim 9, the displaying the plurality of objects on the circular shape comprising:

rearranging an output location of the plurality of objects based on the detected user's hand gripping the electronic device.

12. The method of claim 9, wherein the first user input comprises a gesture of touching a finger of a user's hand at a first location of the touch screen and moving the finger to a second location on the touch screen thereof spaced apart from the first location by a distance.

13. The method of claim 9, wherein the circular shape comprises a circle, a spiral, or a parabola.

* * * * *